US012587216B2

(12) United States Patent (10) Patent No.: US 12,587,216 B2
Onaka et al. (45) Date of Patent: Mar. 24, 2026

(54) ANTENNA MODULE, CONNECTION MEMBER, AND COMMUNICATION DEVICE INCLUDING THE SAME

(71) Applicant: Murata Manufacturing Co., Ltd., Nagaokakyo (JP)

(72) Inventors: Kengo Onaka, Nagaokakyo (JP); Hirotsugu Mori, Nagaokakyo (JP); Yoshiki Yamada, Nagaokakyo (JP); Kaoru Sudo, Nagaokakyo (JP); Hiroshi Izumitani, Nagaokakyo (JP); Hideki Ueda, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 516 days.

(21) Appl. No.: 18/090,524

(22) Filed: Dec. 29, 2022

(65) Prior Publication Data

US 2023/0145095 A1 May 11, 2023

Related U.S. Application Data

(63) Continuation of application No. PCT/JP2021/018983, filed on May 19, 2021.

(30) Foreign Application Priority Data

Jul. 2, 2020 (JP) .................................. 2020-114822
Oct. 14, 2020 (JP) .................................. 2020-173344

(51) Int. Cl.
H04B 1/00 (2006.01)
H01Q 1/50 (2006.01)
(Continued)

(52) U.S. Cl.
CPC ............. H04B 1/0064 (2013.01); H01Q 1/50 (2013.01); H01Q 23/00 (2013.01); H04B 1/40 (2013.01)

(58) Field of Classification Search
CPC ........... H01P 1/047; H01P 5/02; H01Q 1/243; H01Q 1/38; H01Q 1/50; H01Q 21/0025;
(Continued)

(56) References Cited

U.S. PATENT DOCUMENTS 5,008,678 A * 4/1991 Herman ................ G01S 13/931
342/158
2016/0028153 A1 1/2016 Li et al.
(Continued)

FOREIGN PATENT DOCUMENTS

CN 108736160 A 11/2018
CN 110998974 A 4/2020
(Continued)

OTHER PUBLICATIONS

International Search Report and Written Opinion mailed on Aug. 3, 2021, received for PCT Application PCT/JP2021/018983, filed on May 19, 2021, 10 pages including English Translation.
(Continued)

*Primary Examiner* — Nguyen T Vo
(74) *Attorney, Agent, or Firm* — XSENSUS LLP

(57) ABSTRACT

The antenna module includes a first substrate and a second substrate on each of which a radiating element is arranged, a third substrate, and a switch circuit. An RFIC for supplying a radio frequency signal to the first substrate and the second substrate is arranged on the third substrate. The switch circuit is configured to change over a connection between the RFIC and the radiating element on the first substrate and a connection between the RFIC and the radiating element on the second substrate.

18 Claims, 28 Drawing Sheets

(51) Int. Cl.
    *H01Q 23/00*       (2006.01)
    *H04B 1/40*        (2015.01)

(58) Field of Classification Search
    CPC ........ H01Q 21/28; H01Q 23/00; H01Q 25/00;
               H01Q 3/24; H04B 1/0057; H04B 1/006;
              H04B 1/0064; H04B 1/0458; H04B 1/18;
             H04B 1/38; H04B 1/3827; H04B 1/40;
                    H04B 1/44; H05K 1/14
    See application file for complete search history.

(56) References Cited

U.S. PATENT DOCUMENTS

| | | | |
|---|---|---|---|
| 2016/0099738 A1 | 4/2016 | Kodama | |
| 2020/0153098 A1* | 5/2020 | Onaka | H01Q 1/405 |
| 2021/0244308 A1* | 8/2021 | Bosua | A61B 5/4845 |

FOREIGN PATENT DOCUMENTS

| | | | |
|---|---|---|---|
| JP | 2000-221536 A | 8/2000 |
| JP | 2004-95995 A | 3/2004 |
| JP | 2006-340367 A | 12/2006 |
| JP | 2010-538542 A | 12/2010 |
| JP | 2012-238903 A | 12/2012 |
| WO | 2018/008573 A1 | 1/2018 |

OTHER PUBLICATIONS

English translation of Written Opinion mailed on Aug. 3, 2021, in corresponding PCT Application PCT/JP2021/018983, filed on May 19, 2021, 3 pages.

* cited by examiner

RFIC (b)    250   110F   190   130

140A(140B)

RFIC

ANTENNA MODULE, CONNECTION MEMBER, AND COMMUNICATION DEVICE INCLUDING THE SAME

CROSS-REFERENCE TO RELATED APPLICATIONS

The present application is a continuation of International Patent Application No. PCT/JP2021/018983, filed May 19, 2021, which claims priority to Japanese Application No. 2020-114822, filed Jul. 2, 2020, and Japanese Application No. 2020-173344, filed Oct. 14, 2020, the entire contents of each of which being incorporated herein by reference in their entirety.

TECHNICAL FIELD

The present disclosure relates to an antenna module, a connection member, and a communication device including the same. More specifically, the present disclosure relates to a technique for increasing a degree of freedom in an arrangement of an antenna module in a communication device.

BACKGROUND ART

For a mobile communication apparatus represented by a mobile phone or a smartphone, an antenna module for transmitting and receiving a radio wave is used in many cases. For the mobile communication apparatus above, there is still a high demand for reduction in size and thickness, and accordingly, for a unit such as an antenna module included in a device, further reduction in size and lowering the profile are required.

Further, in recent years, with the enlargement of a display region (display) in a communication apparatus, a position where a radiating element (feed element) can be arranged in the communication apparatus is greatly limited in some cases. In the case above, a state may occur in which a close arrangement of a feed element and a motherboard provided with a circuit (integrated circuit (IC)) for processing a radio frequency signal becomes difficult, or restrictions may be imposed on an arrangement of a circuit on a motherboard. Japanese Unexamined Patent Application Publication (Translation of PCT Application) No. 2010-538542 (Patent Document 1) discloses a mobile wireless communication device including an antenna array connected to a wireless device arranged on a printed circuit board through a flexible interconnect. In the communication device described in Japanese Unexamined Patent Application Publication (Translation of PCT Application) No. 2010-538542 (Patent Document 1), an antenna array can be mounted apart from a circuit board with a flexible interconnect having flexibility, and this makes it possible to increase a degree of freedom in an arrangement of a unit in a housing of a wireless apparatus.

CITATION LIST

Patent Document

Patent Document 1: Japanese Unexamined Patent Application Publication (Translation of PCT Application) No. 2010-538542

SUMMARY

Technical Problems

In Japanese Unexamined Patent Application Publication (Translation of PCT Application) No. 2010-538542 (Patent Document 1), a wireless device includes individual RF front-ends corresponding to multiple antenna arrays. That is, RF front-ends of the same number as that of antenna arrays mounted on a wireless device are required. In the case above, under a condition the number of antenna arrays increases, the number of RF front-ends to be arranged on a circuit board also increases. Accordingly, a large mounting area is required on a circuit board, and as a result, it may be a factor that hinders the reduction in size of a wireless apparatus.

The present disclosure has been made to solve the problem described above, as well as other problems, and an object thereof is to reduce an antenna module in size.

Solutions to Problems

An antenna module according to an aspect of the present disclosure includes a first substrate and a first radiating element arranged on the first substrate, a second substrate and a second radiating element arranged on the second substrate, a third substrate having a feed circuit that supplies a radio frequency signal to the first substrate and the second substrate is arranged, and a switch circuit configured to controllably change over a connection between the feed circuit and the first radiating element and a connection between the feed circuit and the second radiating element.

A connection member according to another aspect of the present disclosure includes a dielectric substrate in which a feed wiring line that transfers a radio frequency signal between a feed circuit and each of a first radiating element and a second radiating element, the connection member interconnects a first substrate on which the first radiating element is arranged and a second substrate on which the second radiating element is arranged, and a switch circuit arranged on the dielectric substrate and configured to controllably change over a connection between the feed circuit and the first radiating element and a connection between the feed circuit and the second radiating element.

Advantageous Effects of Disclosure

With the use of the antenna module according to the present disclosure, the feed circuit common to two substrates (first substrate and second substrate), on each of which the radiating element is arranged, is provided on the third substrate. Then, a radio frequency signal from the feed circuit is changed over by the switch circuit and supplied to the radiating element of the first substrate or the radiating element of the second substrate. That is, since one feed circuit is shared by multiple antenna units (radiating element plus substrate), the number of feed circuits may be decreased with respect to the number of antenna units. Thus, an antenna module may be reduced in size.

BRIEF DESCRIPTION OF DRAWINGS

FIG. 6 is a diagram illustrating a detail of a front-end module in FIG. 5.

FIG. 10 is a side view of an antenna module according to Modification 3.

FIG. 11 is a side view of an antenna module according to Modification 4.

FIG. 14 is a view illustrating a first modification of a connection terminal.

FIG. 19 is a side view of the antenna module according to Embodiment 3.

DESCRIPTION OF EMBODIMENTS

Figure 1:
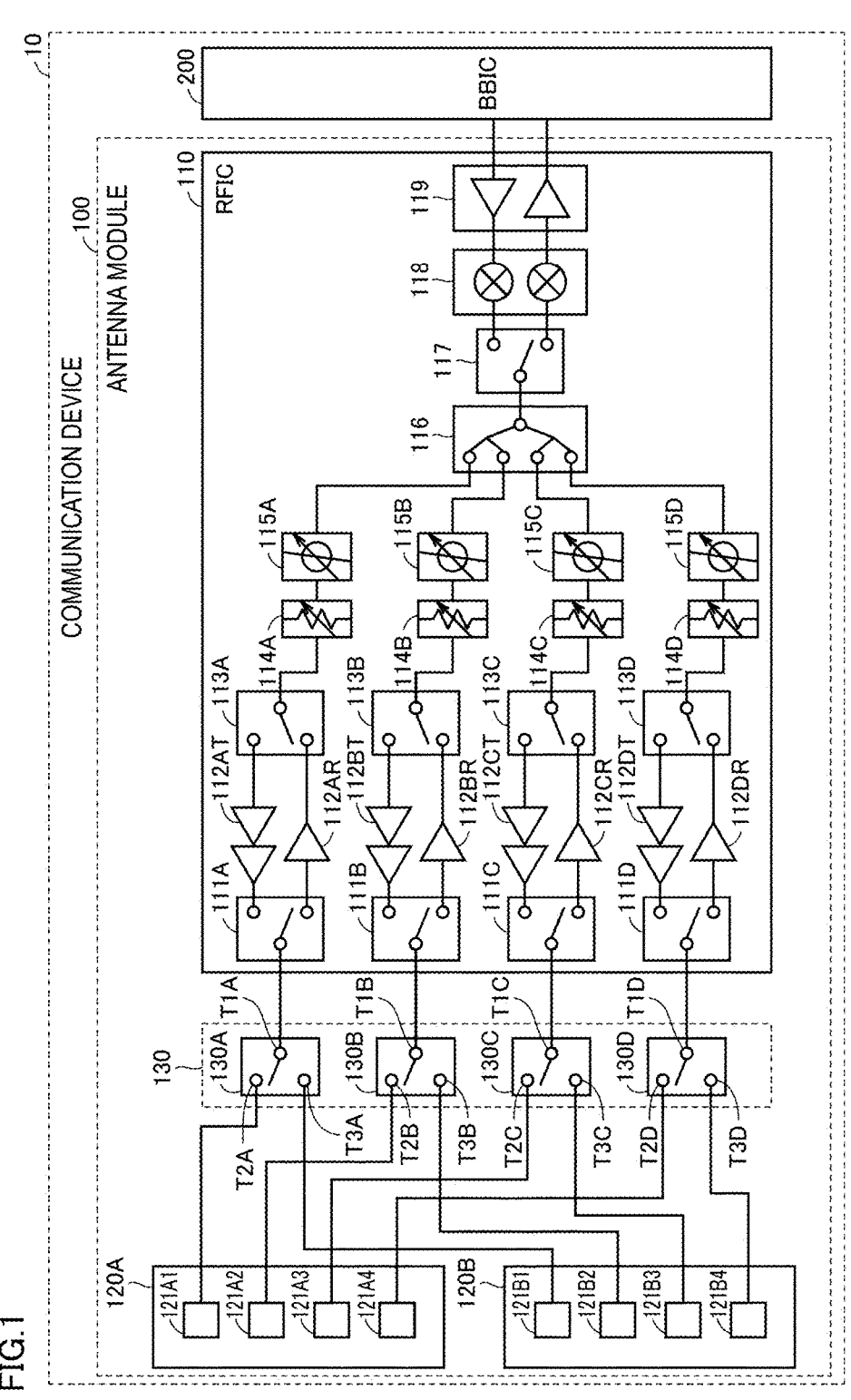
FIG. 1 is a block diagram of a communication device to which an antenna module according to Embodiment 1 is applied.

Hereinafter, embodiments of the present disclosure will be described in detail with reference to the drawings. Note that the same or corresponding portions in the drawings are denoted by the same reference signs, and a description thereof will not be repeated.

Embodiment 1

(Basic Configuration of Communication Device)

FIG. 1 is an example of a block diagram of a communication device 10 to which an antenna module 100 according to Embodiment 1 is applied. The communication device 10 is a mobile terminal such as a mobile phone, a smartphone, or a tablet; a personal computer having a communication function; a base station; or the like, for example. Examples of a radio wave used in the antenna module 100 according to the present embodiment include a radio wave in a millimeter wave band whose center frequency is 28 GHz, 39 GHz, 60 GHz, or the like, for example. However, a radio wave in a frequency band other than the above may be adopted.

Referring to FIG. 1, the communication device 10 includes the antenna module 100 and a BBIC 200 constituting a baseband signal processing circuit. The antenna module 100 includes an RFIC 110 being an example of a feed circuit, antenna units 120A and 120B, and a switch circuit 130. The communication device 10 up-converts a signal, which is transferred from the BBIC 200 to the antenna module 100, into a radio frequency (RF) signal and radiates the radio frequency signal from the antenna unit 120; and down-converts a radio frequency signal received by the antenna unit 120 and processes the down-converted signal in the BBIC 200.

In the example of FIG. 1, to facilitate the explanation, a case is illustrated in which each of the antenna units 120A and 120B (hereinafter also collectively referred to as "antenna unit 120") includes four feed elements (also referred to herein as "radiating elements". Moreover, the feed/radiating elements include structures that not only launch electrical current/voltage signals into a wireless propagation medium as electromagnetic waves, but also transduce electromagnetic waves that interact with radiating elements into current/voltage receive signals). Specifically, the antenna unit 120A includes feed elements 121A1 to 121A4, and the antenna unit 120B includes feed elements 121B1 to 121B4.

Note that, the feed elements 121A1 to 121A4 are also collectively referred to as "feed element 121A". Further, the feed elements 121B1 to 121B4 are also collectively referred to as "feed element 121B". Furthermore, the feed elements 121A and 121B are also collectively referred to as "feed element 121".

In FIG. 1, the antenna unit 120 is a one-dimensional antenna array in which four feed elements 121 are arranged in a line. Note that the number of feed elements 121 is not necessarily plural, and the antenna unit 120 may be formed of one feed element 121. Alternatively, the antenna unit 120 may be an array antenna in which the multiple feed elements 121 are arranged in two dimensions. In the present embodiment, each feed element 121 is a patch antenna having a substantially square, flat plate shape.

The RFIC 110 includes switches 111A to 111D, 113A to 113D, and 117; power amplifiers 112AT to 112DT; low-noise amplifiers 112AR to 112DR; attenuators 114A to 114D; phase shifters 115A to 115D; a signal combiner/divider 116; a mixer 118; and an amplifier 119.

Under a condition a radio frequency signal is transmitted, the switches 111A to 111D and 113A to 113D are controlled to be changed over to connect to the power amplifiers 112AT to 112DT, and the switch 117 is connected to a transmission side amplifier of the amplifier 119. Under a condition a radio frequency signal is received, the switches 111A to 111D and 113A to 113D are controlled to be changed over to connect to the low-noise amplifiers (LNAs) 112AR to 112DR, and the switch 117 is connected to a reception side amplifier of the amplifier 119.

The switch circuit 130 includes switches 130A to 130D that are single-pole multiple throw switches. The switches 130A to 130D are respectively connected to the switches 111A to 111D in the RFIC 110. The switch circuit 130 is controlled by the RFIC 110, for example, and is configured to change over a connection between the RFIC 110 and the feed element 121A of the antenna unit 120A, and a connection between the RFIC 110 and the feed element 121B of the antenna unit 120B.

The switch 130A includes a first terminal T1A, a second terminal T2A, and a third terminal T3A. The first terminal T1A is connected to a common terminal of the switch 111A. The second terminal T2A is connected to the feed element 121A1 of the antenna unit 120A. The third terminal T3A is connected to the feed element 121B1 of the antenna unit 120B.

Similarly, with respect to the switch 130B, a first terminal T1B is connected to a common terminal of the switch 111B, a second terminal T2B is connected to the feed element 121A2 of the antenna unit 120A, and a third terminal T3B is connected to the feed element 121B2 of the antenna unit 120B. With respect to the switch 130C, a first terminal T1C is connected to a common terminal of the switch 111C, a second terminal T2C is connected to the feed element 121A3 of the antenna unit 120A, and a third terminal T3C is connected to the feed element 121B3 of the antenna unit 120B. With respect to the switch 130D, a first terminal T1D is connected to a common terminal of the switch 111D, a second terminal T2D is connected to the feed element 121A4 of the antenna unit 120A, and a third terminal T3D is connected to the feed element 121B4 of the antenna unit 120B.

Under a condition a radio frequency signal is transmitted and received with the antenna unit 120A, the switches 130A to 130D are respectively changed over to the second terminals T2A to T2D. The term "changed over" is to be understood as a circuitry controlled operation that uses dedicated circuitry, or programmable circuitry. Under a condition a radio frequency signal is transmitted and received with the antenna unit 120B, the switches 130A to 130D are respectively changed over to the third terminals T3A to T3D.

A signal transferred from the BBIC 200 is amplified by the amplifier 119 and up-converted by the mixer 118. A transmission signal, which is an up-converted radio frequency signal, is divided into four signals by the signal combiner/divider 116, then the four signals pass through four signal paths, and are fed to the feed elements 121 different from each other. At this time, the directivity of the antenna unit 120 may be adjusted by individually adjusting a phase shift degree in each of the phase shifters 115A to 115D arranged in the respective signal paths.

Reception signals, which are radio frequency signals received by the feed elements 121, pass through four different signal paths, and are combined by the signal combiner/divider 116. The combined reception signal is down-converted by the mixer 118, amplified by the amplifier 119, and transferred to the BBIC 200.

(Configuration of Antenna Module)

Figure 2:
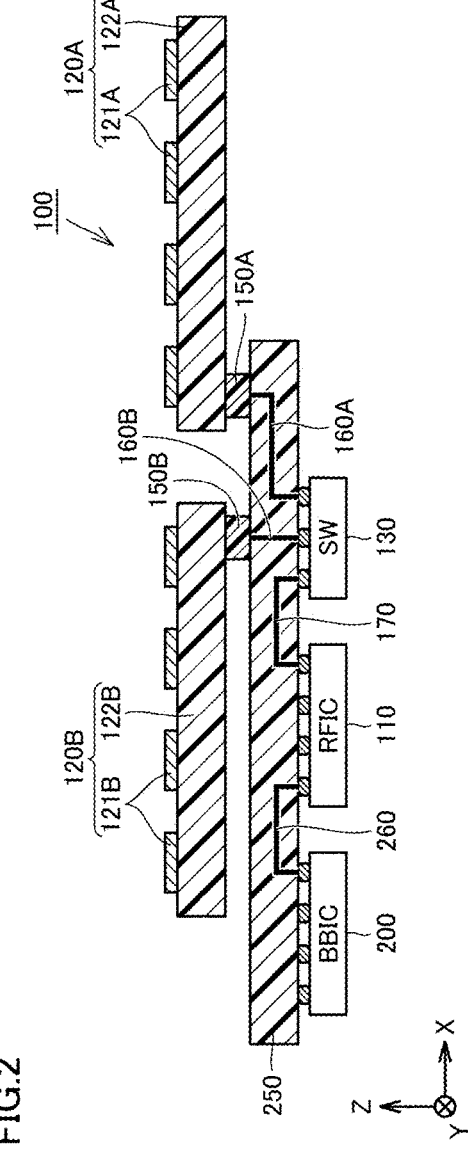
FIG. 2 is a side view of the antenna module according to Embodiment 1.

FIG. 2 is a side view of the antenna module 100 according to Embodiment 1. The antenna module 100 includes the RFIC 110, the antenna unit 120A in which the feed element 121A is formed on a dielectric substrate 122A, the antenna unit 120B in which the feed element 121B is formed on a dielectric substrate 122B, and the switch circuit 130. The dielectric substrate 122A and the dielectric substrate 122B are also collectively referred to as "dielectric substrate 122".

The RFIC 110 and the switch circuit 130 are arranged on a motherboard 250. The RFIC 110 is electrically connected to the BBIC 200 also arranged on the motherboard 250 by a connection wiring line 260. Further, the RFIC 110 is connected to the switch circuit 130 by a connection wiring line 170. Note that, in FIG. 2 and the following description, a normal direction of the motherboard 250 is defined as a Z-axis direction, and directions (in-plane directions of motherboard 250) orthogonal to the Z-axis direction are defined as an X-axis direction and a Y-axis direction.

The antenna unit 120A is connected to the motherboard 250 with a connection terminal 150A. The antenna unit 120B is connected to the motherboard 250 with a connection terminal 150B. The connection terminals 150A and 150B are connectors configured to be detachable, for example. Note that, the connection terminals 150A and 150B may be formed by solder bumps.

In the antenna unit 120, the dielectric substrate 122 on which the feed element 121 is formed is, for example, a low temperature co-fired ceramic (LTCC) multilayer substrate, a multilayer resin substrate formed by laminating multiple resin layers formed of resin such as epoxy or polyimide, a multilayer resin substrate formed by laminating multiple resin layers formed of liquid crystal polymer (LCP) having a lower dielectric constant, a multilayer resin substrate formed by laminating multiple resin layers formed of fluororesin, or a ceramic multilayer substrate other than LTCC. Note that the dielectric substrate 122 does not necessarily have a multilayer structure, and may be a single-layer substrate.

The feed element 121 has a flat plate shape and is formed of a conductor such as copper or aluminum. The shape of the feed element 121 is not limited to a rectangle as illustrated in FIG. 1, and may be a polygon, a circle, an ellipse, or a cross. The feed element 121 is formed on a surface of the dielectric substrate 122 or in an internal layer thereof. In the example of FIG. 2, an array antenna is illustrated in which four feed elements 121 are arranged in one direction, but the feed element 121 may be formed alone, or the array antenna may have a configuration in which multiple feed elements 121 are arranged in one dimension or two dimensions. Note that, although not illustrated in FIG. 2, a ground electrode is arranged in the dielectric substrate 122 to face the feed element 121.

The switch circuit 130 is connected to the antenna unit 120A with a feed wiring line 160A via the connection terminal 150A. Further, the switch circuit 130 is connected to the antenna unit 120B with a feed wiring line 160B via the connection terminal 150B. A radio frequency signal from the RFIC 110 is changed over by the switch circuit 130 to be supplied to the feed element 121A of the antenna unit 120A, or the feed element 121B of the antenna unit 120B. Under a condition a radio frequency signal is supplied to the antenna unit 120A, a radio wave is radiated from the feed element 121A, and no radio wave is radiated from the feed element 121B. To the contrary, under a condition a radio frequency signal is supplied to the antenna unit 120B, a radio wave is radiated from the feed element 121B, and no radio wave is radiated from the feed element 121A.

Under a condition multiple antenna units are provided in an antenna module, an RFIC is individually arranged for each antenna unit in many cases. In the case above, a substrate (motherboard, for example) on which the RFICs are arranged requires a mounting area for arranging all the RFICs. In a communication device such as a mobile terminal, in order to ensure connection with a base station, a configuration is being adopted in which multiple antenna units are provided and radio waves can be radiated in and received from different directions. In contrast, an increase in a substrate area due to an increase in the number of antenna units may become a factor that hinders the reduction in size of an antenna module and a wireless apparatus.

However, as in Embodiment 1, the number of RFICs may be decreased with respect to the number of antenna units by adopting a configuration in which an RFIC is made common to the multiple antenna units and the antenna units are used by being changed over by a switch circuit. This may relieve a constraint to reduce a size of a wireless apparatus. Further, since an RFIC is a component that is relatively more expensive than other components, decreasing the number of RFICs may contribute to cost reduction.

Note that, in the description above, an example has been described in which two antenna units are connected to one RFIC via a switch circuit. However, three or more antenna units may be connected to an RFIC.

"Dielectric substrate 122A", "dielectric substrate 122B", and "motherboard 250" in Embodiment 1 respectively correspond to "first substrate", "second substrate", and "third substrate" in the present disclosure.

(Modification 1)

Figure 3:
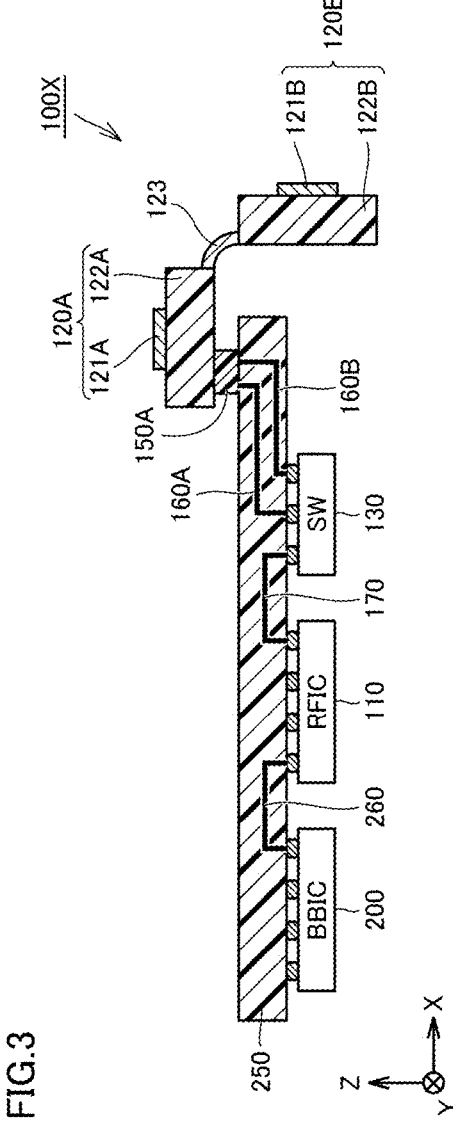
FIG. 3 is a side view of an antenna module according to Modification 1.
Figure 4:
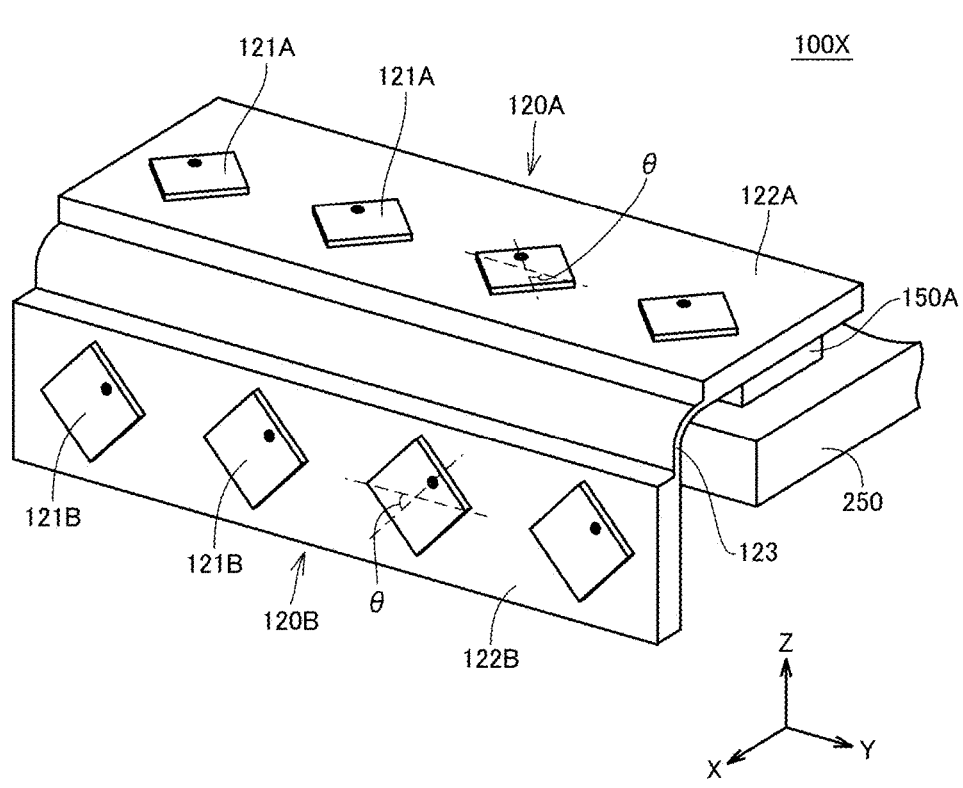
FIG. 4 is a perspective view of the antenna module in FIG. 3.

In Embodiment 1, a configuration has been described in which the antenna unit 120A and the antenna unit 120B are individually connected to the motherboard 250. In Modification 1, a configuration will be described in which the antenna unit 120A and the antenna unit 120B are connected to each other. FIG. 3 is a side view of an antenna module 100X according to Modification 1. FIG. 4 is a perspective view of the antenna module 100X. Note that, in the description of FIG. 3 and FIG. 4, the description of elements overlapping those of the antenna module 100 of Embodiment 1 will not be repeated.

Referring to FIG. 3 and FIG. 4, in the antenna module 100X, the antenna unit 120A is connected to the motherboard 250 with the connection terminal 150A in the similar manner as in the antenna module 100 of Embodiment 1. However, the antenna unit 120B is connected to the antenna unit 120A with a bent connection member 123.

The antenna units 120A and 120B and the connection member 123 have a substantially L-shape in plan view in the Y-axis direction as illustrated in FIG. 3. A radio wave is radiated in the Z-axis direction from the feed element 121A of the antenna unit 120A. Further, a radio wave is radiated in the X-axis direction from the feed element 121B of the antenna unit 120B.

In the antenna module 100X, the antenna units 120A and 120B extend in the Y-axis direction as illustrated in FIG. 4. The feed elements 121A of the antenna unit 120A are arranged in the Y-axis direction on the dielectric substrate 122A. Further, the feed elements 121B of the antenna unit 120B are arranged in the Y-axis direction on the dielectric substrate 122B.

The feed wiring line 160B extends from the connection terminal 150A to the dielectric substrate 122B through the dielectric substrate 122A and the connection member 123, and transfers a radio frequency signal to (or from) the feed elements 121B on the dielectric substrate 122B.

Note that, in the antenna units 120A and 120B of the antenna module 100X of Modification 1, feed elements are arranged such that a polarization direction of the radio wave radiated from each of the feed elements is inclined by θ relative to the arrangement direction (that is, Y-axis direction) of the feed elements. The magnitude of θ is greater than 0° and less than 90°, and θ equals 45° in one example. Even in a case where a dimension of a dielectric substrate in the polarization direction is limited, by arranging a feed element to be inclined as described above, a distance from the feed element to an end portion of the dielectric substrate (ground electrode) is increased, and deterioration of a frequency band width may be suppressed.

Further, even in a configuration in which the antenna unit 120A and the antenna unit 120B are connected to each other by the connection member 123 as in the antenna module 100X of Modification 1, by adopting a configuration in which the RFIC 110 is made common to multiple antenna units and the antenna units are used by being changed over by the switch circuit 130, a factor that hinders the reduction in size of a wireless apparatus may be reduced.

Note that, a configuration is illustrated in FIG. 3 in which the dielectric substrate 122A of the antenna unit 120A and the dielectric substrate 122B of the antenna unit 120B are formed as individual substrates and are connected with the connection member 123. However, the dielectric substrates 122A and 122B and the connection member 123 may integrally be formed as a single substrate, and the single substrate may be configured to be bent at a portion of the connection member 123.

Embodiment 2

In Embodiment 1, a configuration example has been described in which multiple antenna units are directly connected to a motherboard.

However, in recent years, with the enlargement of a display region (display) in a communication apparatus, as recognized by the present inventors, a location at which an antenna unit can be arranged in the communication apparatus is greatly limited in some cases, and there is a possibility that the antenna unit cannot be arranged close to a motherboard.

Then, in Embodiment 2, a configuration is adopted in which a connection member is arranged between a motherboard and an antenna unit to extend a signal transfer path from the motherboard to the antenna unit, thereby increasing a degree of freedom in a layout of the antenna unit in a communication device. Further, in Embodiment 2, amplifiers are further arranged on a connection member to suppress a decrease in loss due to signal attenuation accompanying the extension of a signal transfer path.

(Basic Configuration of Communication Device)

Figure 5:
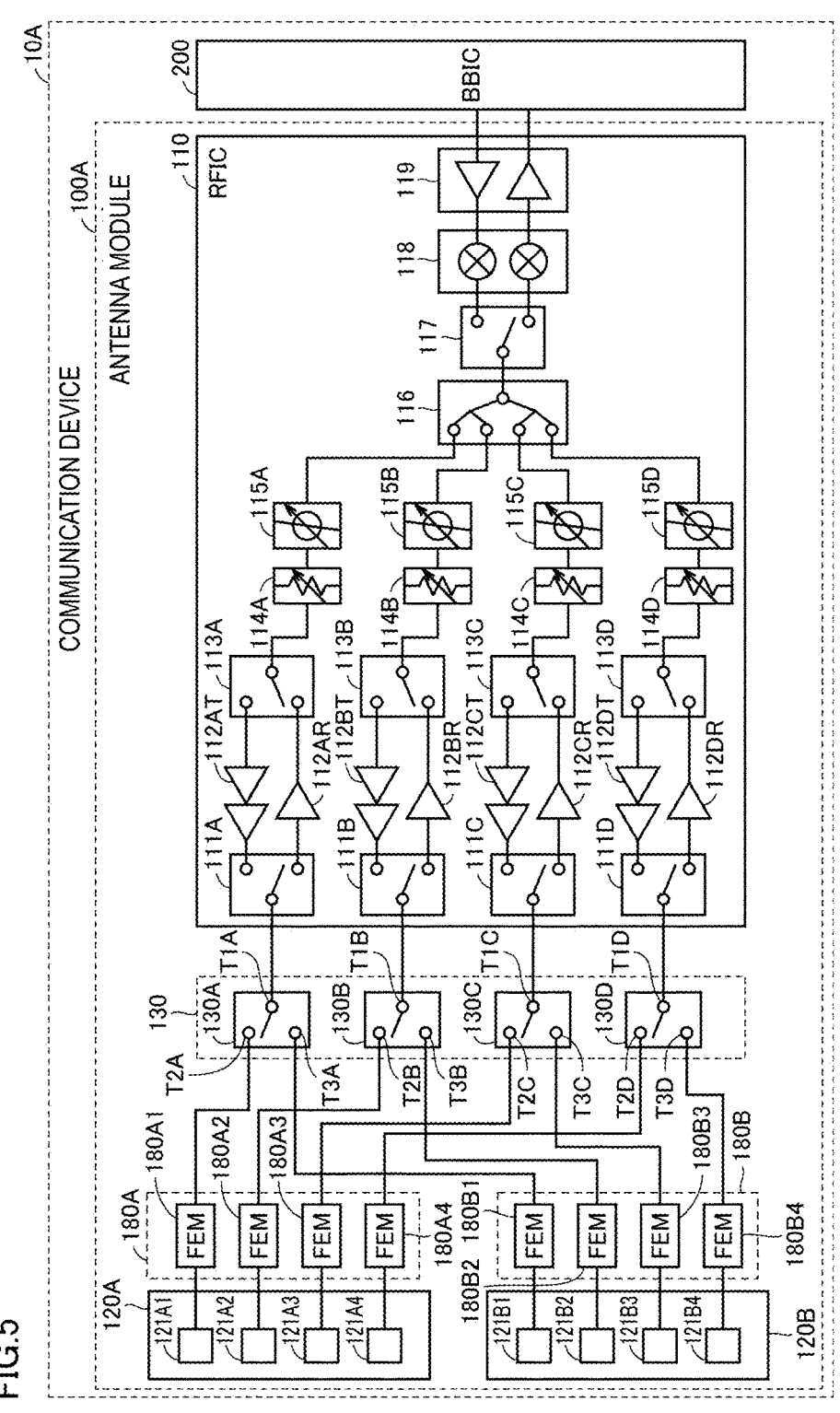
FIG. 5 is a block diagram of a communication device to which an antenna module according to Embodiment 2 is applied.

FIG. 5 is a block diagram of a communication device 10A to which an antenna module 100A according to Embodiment 2 is applied. The antenna module 100A has a configuration in which front-end modules (hereinafter also referred to as "FEMs") 180A and 180B are added to the antenna module 100 of Embodiment 1 illustrated in FIG. 1. In the antenna module 100A of FIG. 5, the description of elements overlapping those of the antenna module 100 in FIG. 1 will not be repeated.

Referring to FIG. 5, in the antenna module 100A, the FEM 180A is arranged on a signal transfer path between the switch circuit 130 and the antenna unit 120A, and the FEM 180B is arranged on a signal transfer path between the switch circuit 130 and the antenna unit 120B.

The FEM 180A includes an FEM 180A1 to an FEM 180A4. The FEM 180A1 is connected between the second terminal T2A of the switch 130A and the feed element 121A1. The FEM 180A2 is connected between the second terminal T2B of the switch 130B and the feed element 121A2. The FEM 180A3 is connected between the second terminal T2C of the switch 130C and the feed element 121A3. The FEM 180A4 is connected between the second terminal T2D of the switch 130D and the feed element 121A4.

The FEM 180B includes an FEM 180B1 to an FEM 180B4. The FEM 180B1 is connected between the third terminal T3A of the switch 130A and the feed element 121B1. The FEM 180B2 is connected between the third terminal T3B of the switch 130B and the feed element 121B2. The FEM 180B3 is connected between the third terminal T3C of the switch 130C and the feed element 121B3. The FEM 180B4 is connected between the third terminal T3D of the switch 130D and the feed element 121B4. Note that, in the following description, the FEMs 180A and 180B (and FEMs included therein) are also collectively referred to as "FEM 180".

Figure 6:
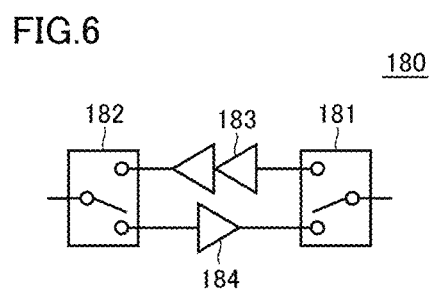

The FEM 180 includes switches 181 and 182, a power amplifier 183, and a low-noise amplifier 184 as illustrated in FIG. 6. In the FEM 180, the switches 181 and 182 are changed over to the power amplifier 183 when transmitting a radio frequency signal, and the switches 181 and 182 are changed over to the low-noise amplifier 184 when receiving a radio frequency signal, the same as the switches 111A to 111D and 113A to 113D, the power amplifiers 112AT to 112DT, and the low-noise amplifiers 112AR to 112DR provided inside the RFIC 110.

The FEM 180 is an amplifier that amplifies a radio frequency signal transferred between the RFIC 110 and the antenna unit 120 to compensate for attenuation occurring between the RFIC 110 and the antenna unit 120. In particular, it is effective under a condition the length of a signal transfer path from the RFIC 110 to each antenna unit is relatively long and an amplification factor is insufficient in a power amplifier and a low-noise amplifier in the RFIC 110. Note that, a case has been described in FIG. 6 in which the FEM 180 includes both the power amplifier 183 and the low-noise amplifier 184. However, it is sufficient that the FEM 180 includes at least one of the power amplifier 183 and the low-noise amplifier 184, and the FEM 180 may have a configuration in which either the power amplifier 183 or the low-noise amplifier 184 is included.

Note that "FEM 180A" and "FEM 180B" respectively correspond to "first amplifier" and "second amplifier" in the present disclosure.

(Configuration of Antenna Module)

Figure 7:
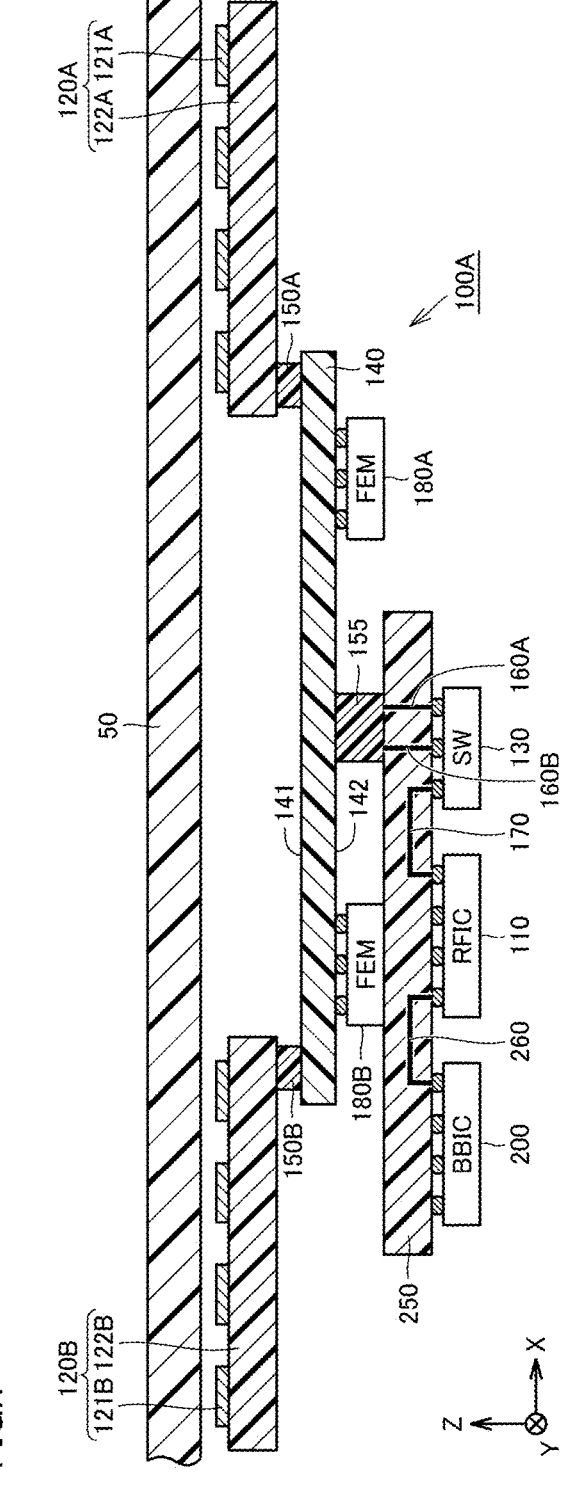
FIG. 7 is a side view of the antenna module according to Embodiment 2.

FIG. 7 is a side view of the antenna module 100A according to Embodiment 2. The antenna module 100A includes, similarly to as in Embodiment 1, the RFIC 110 and the switch circuit 130 that are arranged on the motherboard 250, and the antenna units 120A and 120B. The antenna module 100A further includes a connection member 140 and the FEMs 180A and 180B. Note that, in the antenna module 100A, the description of elements overlapping those of the antenna module 100 will not be repeated.

Referring to FIG. 7, the connection member 140 is a member for transferring a radio frequency signal from the RFIC 110 arranged on the motherboard 250 to the antenna units 120A and 120B, and has multiple feed wiring lines formed therein as will be described later in FIG. 8. The connection member 140 is used as a signal transfer path under a condition the antenna units 120A and 120B are arranged at positions apart from the motherboard 250 in the communication device 10.

The connection member 140 has a dielectric substrate 143 (FIG. 8) formed of a ceramic such as LTCC or a resin, the same as the dielectric substrate 122 forming an antenna unit. The dielectric substrate 143 has a multilayer structure in which multiple dielectric layers are laminated. The connection member 140 may be formed of a rigid material that does not deform, or may be formed of a flexible material as will be described later in FIG. 11 and FIG. 12.

The connection member 140 is connected to the antenna units 120A and 120B with connection terminals 150A and 150B, respectively, on a front surface 141 of the connection member 140. Further, the connection member 140 is connected to the motherboard 250 with a connection terminal 155 on a back surface 142 of the connection member 140. Each of the connection terminals 150A, 150B, and 155 is formed of a connector configured to be detachable or a solder bump.

The FEM 180A is arranged at a position of the connection member 140 between a point connected to the dielectric substrate 122A of the antenna unit 120A (that is, connection terminal 150A), and a point connected to the motherboard 250 (that is, connection terminal 155). Further, the FEM 180B is arranged at a position of the connection member 140 between a point connected to the dielectric substrate 122B of the antenna unit 120B (that is, connection terminal 150B), and a point connected to the motherboard 250 (that is, connection terminal 155).

In the example of FIG. 7, the FEM 180 is arranged on the back surface 142 of the connection member 140. As described in FIG. 6, since the FEM 180 is an amplifier including the power amplifier 183 and/or the low-noise amplifier 184, heat may be generated during signal amplification. The antenna unit 120 is accommodated in a housing 50 of the communication device 10A, and as illustrated in FIG. 7, the antenna unit 120 is arranged on a side of the front surface 141 of the connection member 140 to face the housing 50. Accordingly, in a case where the FEM 180 is arranged on the side of the front surface 141 of the connection member 140, the FEM 180 and the housing 50 are positioned close to each other, and the temperature of the housing 50 may partially increase due to the heat from the FEM 180. Arranging the FEM 180 on the back surface 142 of the connection member 140 and ensuring a separation distance between the FEM 180 and the housing 50 may suppress the heat transfer to the housing 50.

Note that, the FEM 180 may be arranged such that at least a portion thereof is in contact with the motherboard 250 as with the FEM 180B in FIG. 7. With the configuration above, the heat generated in the FEM 180 may directly be transferred to the motherboard 250, and heat dissipation efficiency may further be increased. Further, a housing of the FEM 180 may be in direct contact with the motherboard 250, or the FEM 180 and the motherboard 250 may be made to be in contact with each other by arranging a highly heat-conductive member (that is, metallic member such as copper) therebetween.

Note that, under a condition a sufficient distance may be ensured between the FEM 180 and the housing 50, or under a condition a heat insulation member or a heat shielding member such as another unit is provided between the FEM 180 and the housing 50, the FEM 180 may be arranged on the front surface 141 of the connection member 140. The housing 50 may be made of a material that is transparent or substantially transparent to RF energy so radio waves pass through the housing 50 when launched from, or received by, the feed elements 121.

The FEM 180 may directly be connected to the connection member 140 by using a solder bump, a connector, or the like, or may be connected via an intermediate substrate such as an interposer. Further, in order to lower the profile, a portion of the connection member 140 where the FEM 180 is arranged may be made thinner than other portions.

A radio frequency signal from the RFIC 110 is supplied to the antenna unit 120A through the feed wiring line 160A via the switch circuit 130. Further, a radio frequency signal from the RFIC 110 is supplied to the antenna unit 120B through the feed wiring line 160B via the switch circuit 130.

Figure 8:
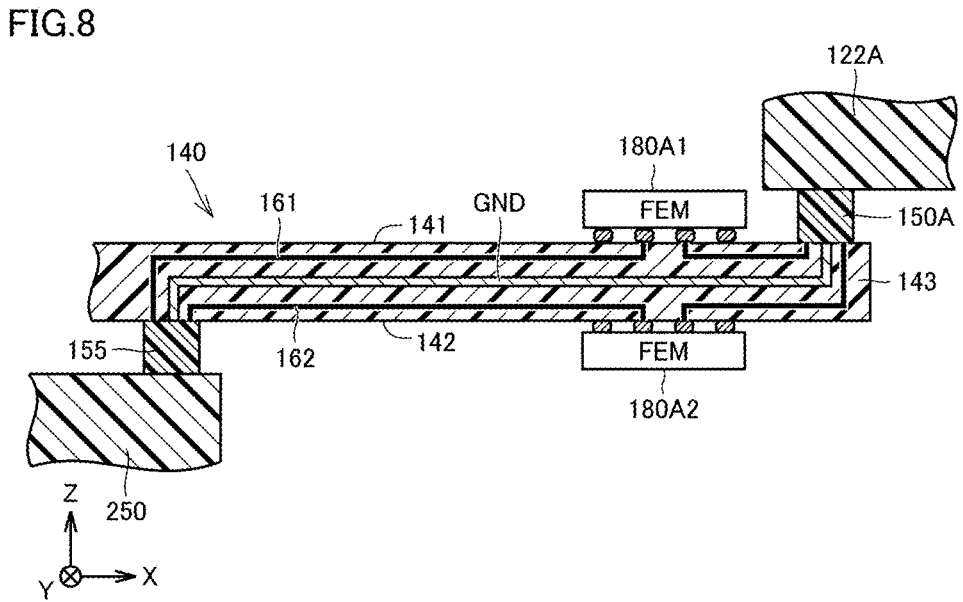
FIG. 8 is a view illustrating an example of an internal structure of a connection member.

FIG. 8 is a view illustrating an example of an internal structure of the connection member 140. In FIG. 8, two signal transfer paths for the antenna unit 120A will be described to facilitate the explanation. In the example of FIG. 8, the FEM 180A1 is arranged on the front surface 141 of the connection member 140, and the FEM 180A2 is arranged on the back surface 142 of the connection member 140. In the connection member 140, feed wiring lines 161 and 162 and a ground electrode GND are formed. The feed wiring line 161 transfers a radio frequency signal to the feed element 121A of the antenna unit 120A via the FEM 180A1. Further, the feed wiring line 162 transfers a radio frequency signal to another feed element 121A via the FEM 180A2.

Note that, a configuration has been described in FIG. 8 in which FEMs and feed wiring lines corresponding to different radiating elements in the same antenna unit are separately arranged on front and back surfaces of a connection member. However, FEMs and feed wiring lines corresponding to different antenna units may separately be arranged on front and back surfaces of a connection member. For example, an FEM and a feed wiring line corresponding to a first antenna unit may be arranged on a front surface of a connection member, and an FEM and a feed wiring line corresponding to a second antenna unit may be arranged on back surfaces of the connection member. Further, an FEM and a feed wiring line corresponding to some of the radiating elements of a first antenna unit and a second antenna unit may be arranged on a front surface of a connection member, and an FEM and a feed wiring line corresponding to the remaining radiating elements may be arranged on a back surface of the connection member.

The feed wiring line 161 and the feed wiring line 162 are formed in different layers in the dielectric substrate 143. The ground electrode GND is formed between a layer in which the feed wiring line 161 is formed and a layer in which the feed wiring line 162 is formed, and is connected to a reference electric potential (not illustrated) formed on the motherboard 250 via the connection terminal 155. Further, the ground electrode GND is connected to a ground electrode (not illustrated) formed in the dielectric substrate 122A of the antenna unit 120A via the connection terminal 150A.

Note that "feed wiring line 161" and "feed wiring line 162" respectively correspond to "first wiring line" and "second wiring line" of the present disclosure.

As described above, when a radio frequency signal is supplied to the antenna unit 120 through multiple feed wiring lines, by forming the feed wiring lines in different layers in the connection member 140, the area of the connection member 140 in a main surface direction (XY plane) may be reduced in comparison with a case where all the feed wiring lines are formed in the same layer. Further, by arranging feed wiring lines to sandwich a ground electrode, the isolation between the feed wiring lines may be ensured.

Note that, although not illustrated in FIG. 8, the same configuration may be adopted for a signal transfer path to the antenna unit 120B. Further, in FIG. 8, the configuration has been described in which feed wiring lines are formed in two different layers, but the feed wiring lines may be formed in three or more different layers. Also, in the case above, it is an option to arrange a ground electrode between dielectric layers in which feed wiring lines are formed.

As described above, by arranging a connection member between a motherboard and an antenna unit and extending a signal transfer path from the motherboard to the antenna unit, it becomes possible to increase a degree of freedom in a layout of an antenna unit in a communication device.

Further, by arranging an amplifier on a connection member, a decrease in loss due to signal attenuation accompanying the extension of a signal transfer path may be suppressed.
(Modification 2)

In the antenna module 100A of Embodiment 2 in FIG. 7, a configuration has been described in which a switch circuit is arranged on a motherboard. In Modification 2, a configuration will be described in which a switch circuit is arranged on a connection member.

Figure 9:
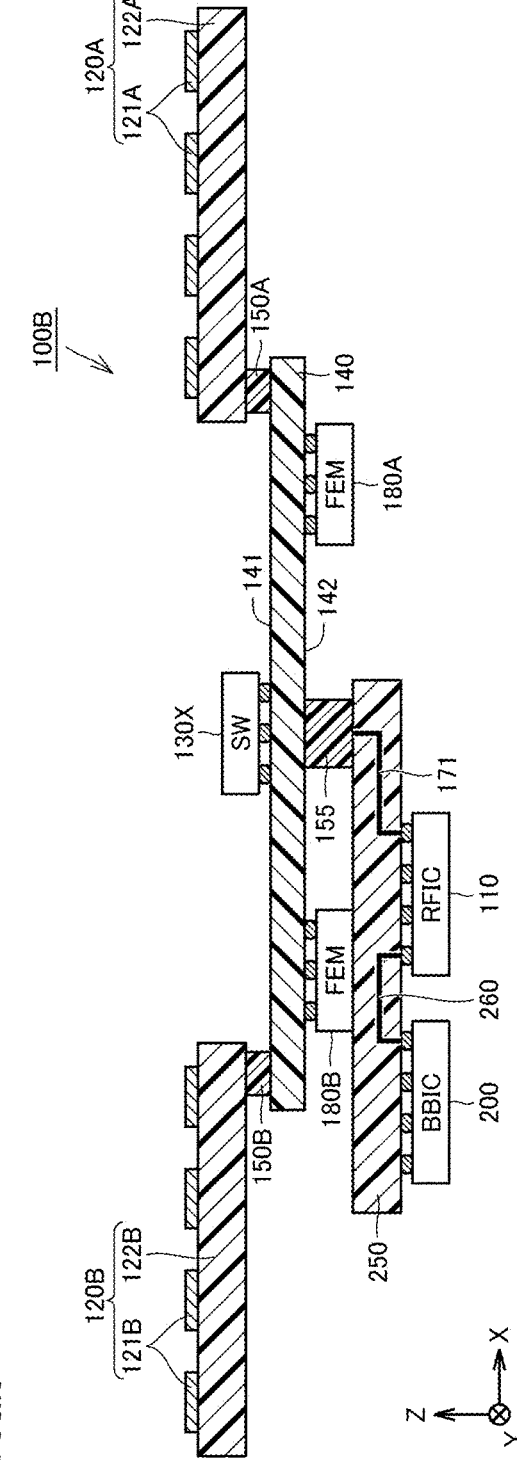
FIG. 9 is a side view of an antenna module according to Modification 2.

FIG. 9 is a side view of an antenna module 100B according to Modification 2. The antenna module 100B has a configuration in which the position of the switch circuit in the antenna module 100A illustrated in FIG. 7 is changed to a position on the connection member 140. In the antenna module 100B, the description of elements overlapping those of the antenna module 100A will not be repeated.

Referring to FIG. 9, also in the antenna module 100B, the connection member 140 is connected to the motherboard 250 via the connection terminal 155. The antenna units 120A and 120B are respectively connected to the connection member 140 via the connection terminals 150A and 150B.

A switch circuit 130X is arranged on the front surface 141 of the connection member 140, and is connected to the RFIC 110 with a connection wiring line 171 via the connection terminal 155. Note that, although not illustrated in FIG. 9, the switch circuit 130X feeds a radio frequency signal from the RFIC 110 to the antenna unit 120 via the FEM 180 through a feed wiring line formed inside the connection member 140. Further, the switch circuit 130X may also be arranged on the back surface 142 of the connection member 140.

As described above, by arranging a switch circuit on a connection member, the number of components arranged on a motherboard decreases, and the motherboard may be reduced in size. In particular, in a case where a large number of antenna units are arranged in a communication device, the number of switch circuits also increases, and this makes the effect of reduction in size remarkable.
(Modification 3)

In the antenna module 100A of Embodiment 2 in FIG. 7, a configuration has been described in which multiple antenna units are connected to a common connection member. However, in a case where two antenna units are arranged far apart from each other, for example, under a condition a common connection member is used, the length of the connection member becomes long. This may make it difficult to mount the antenna units on a communication device.

Then, in Modification 3, a configuration will be described in which connection members, to connect to a motherboard, are individually provided to multiple antenna units to which a radio frequency signal is supplied from a common switch circuit.

Figure 10:
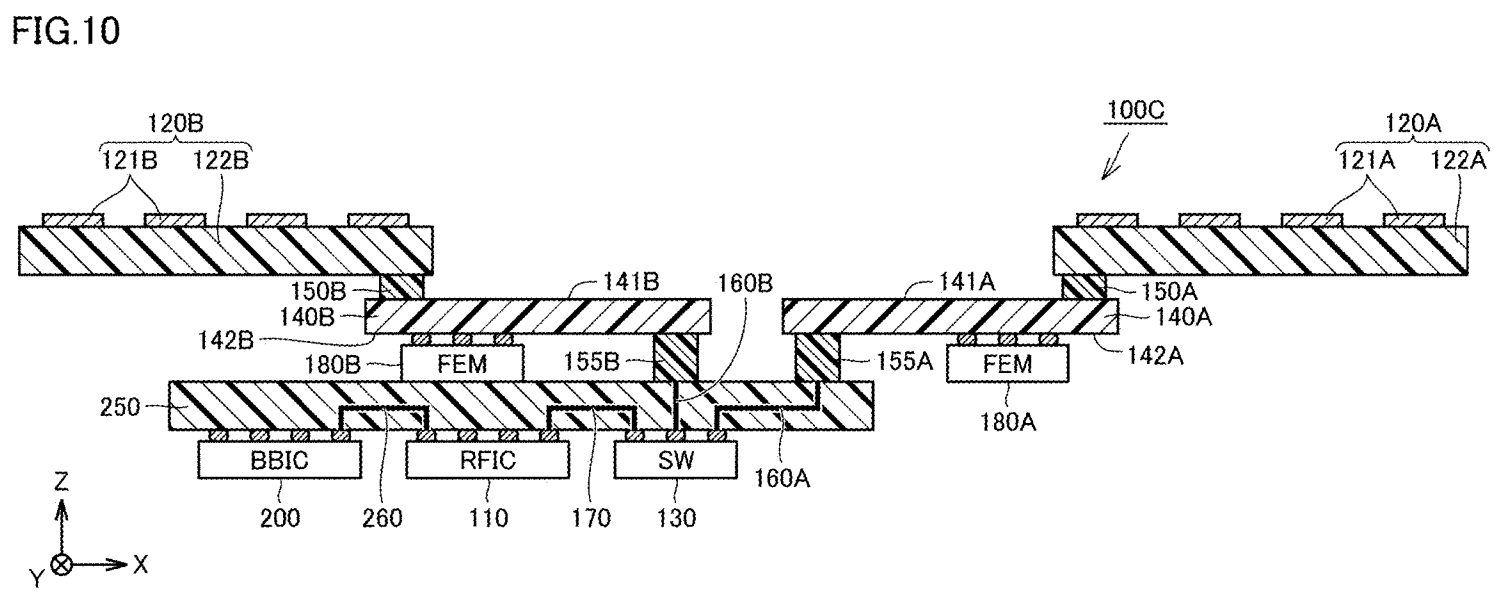

FIG. 10 is a side view of an antenna module 100C according to Modification 3. In the antenna module 100C, connection members 140A and 140B are used instead of the connection member 140 in the antenna module 100A illustrated in FIG. 7. Note that, in the antenna module 100C, the description of elements overlapping those of the antenna module 100A will not be repeated.

Referring to FIG. 10, the connection member 140A is connected to the motherboard 250 with a connection terminal 155A, and is connected to the antenna unit 120A with the connection terminal 150A. The FEM 180A is arranged on the connection member 140A. A radio frequency signal from the switch circuit 130 arranged on the motherboard 250 is supplied to the feed element 121A of the antenna unit 120A through the feed wiring line 160A via the connection member 140A.

Similarly, the connection member 140B is connected to the motherboard 250 with a connection terminal 155B, and is connected to the antenna unit 120B with the connection terminal 150B. The FEM 180B is arranged on the connection member 140B. A radio frequency signal from the switch circuit 130 arranged on the motherboard 250 is supplied to the feed element 121B of the antenna unit 120B through the feed wiring line 160B via the connection member 140B.

Note that, although the FEM 180A is arranged on a back surface 142A of the connection member 140A in FIG. 10, the FEM 180A may be arranged on a front surface 141A of the connection member 140A. Further, the FEM 180B may also be arranged on a front surface 141B of the connection member 140B instead of a back surface 142B of the connection member 140B.

Note that "connection member 140A" and "connection member 140B" respectively correspond to "first connection member" and "second connection member" in the present disclosure. Further, "FEM 180A" and "FEM 180B" respectively correspond to "first amplifier" and "second amplifier" in the present disclosure.

As described above, by individually providing connection members to multiple antenna units, the total size of the connection members may be reduced in comparison with a case where a common connection member is used. This makes it easy to mount an antenna unit on a communication device.

(Modification 4)

In Modification 4 and Modification 5 that is to be described later, a case will be described in which a flexible connection member is used.

Figure 11:
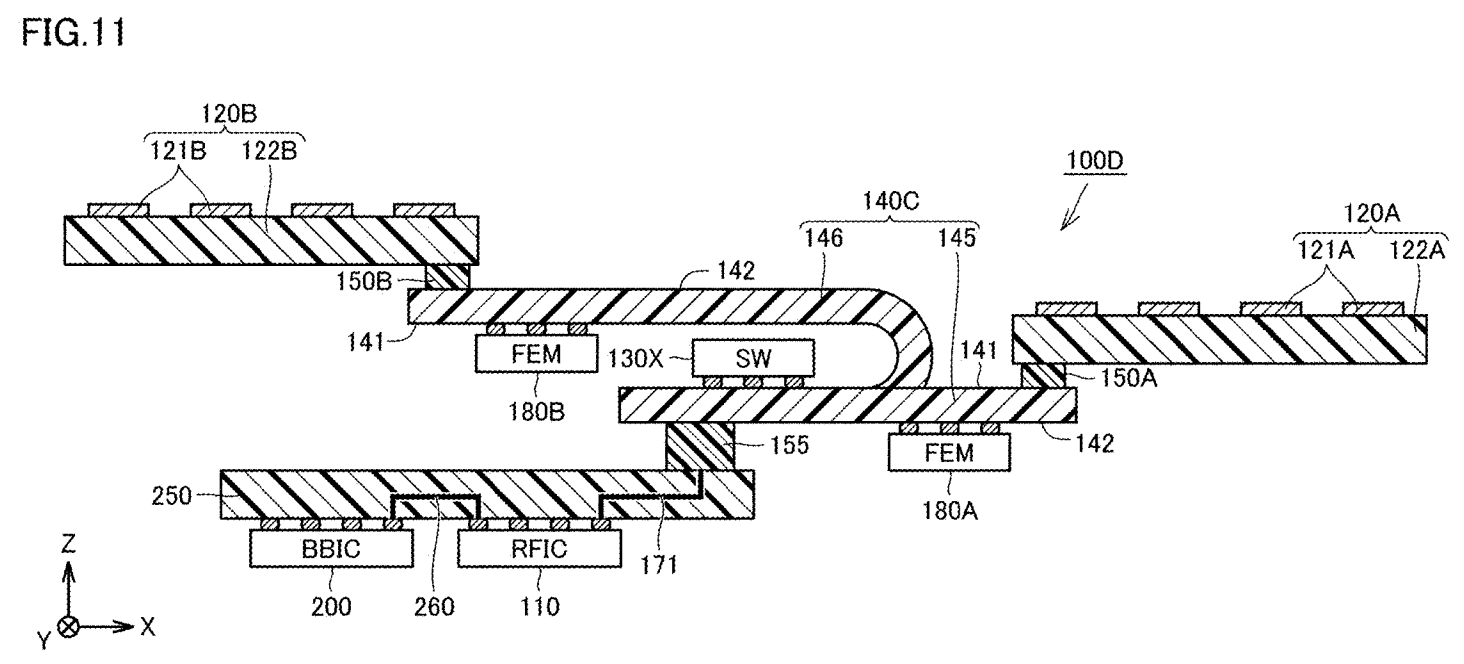

FIG. 11 is a side view of an antenna module 100D according to Modification 4. In the antenna module 100D, the connection member 140 of the antenna module 100A illustrated in FIG. 7 is replaced with a connection member 140C. Note that, in the antenna module 100D, the description of elements overlapping those of the antenna module 100A will not be repeated.

Referring to FIG. 11, the connection member 140C is a flexible substrate formed of a material having flexibility, and is configured to be bendable in a thickness direction. In the example of FIG. 11, the connection member 140C has a configuration in which a second portion 146 branches off from a first portion 145. The second portion 146 is bent after branching off from the first portion 145, and extends in a direction opposite to the first portion 145.

The first portion 145 of the connection member 140C is connected to the motherboard 250 with the connection terminal 155. The antenna unit 120A is connected to the first portion 145 of the connection member 140C with the connection terminal 150A. Further, the antenna unit 120B is connected to the second portion 146 of the connection member 140C with the connection terminal 150B. The FEM 180A and the FEM 180B are respectively arranged in the first portion 145 and the second portion 146.

Further, in the connection member 140C, the switch circuit 130X is arranged at a position closer to the connection terminal 155 than to the branch of the second portion 146. As in the antenna module 100B illustrated in FIG. 9, the switch circuit 130X is connected to the RFIC 110 arranged on the motherboard 250 with the connection wiring line 171. A radio frequency signal from the RFIC 110 is supplied to the antenna unit 120A or the antenna unit 120B by the switch circuit 130X.

Note that, in FIG. 11, a configuration has been described in which a connection member shared by multiple antenna units is formed of a flexible material and the connection member is partially branched and bent. However, the connection member does not necessarily have a configuration being branched in the middle. Further, in a configuration in which individual connection members are provided to antenna units as illustrated in Modification 3 of FIG. 10, some or all of the connection members may be formed of a material having flexibility.

As described above, by connecting an antenna unit and a motherboard by using a flexible connection member, it becomes possible to increase a degree of freedom in a layout of an antenna unit in a housing of a communication device. Further, by arranging an FEM on a connection member, deterioration of antenna characteristics due to extension of a signal transfer path may be suppressed.

(Modification 5)

In Modification 4 of FIG. 11, a configuration example has been described in which a connection member is bent and branched in the thickness direction. In Modification 5, a configuration will be described in which a connection member is bent and branched in an in-plane direction of the main surface.

Figure 12:
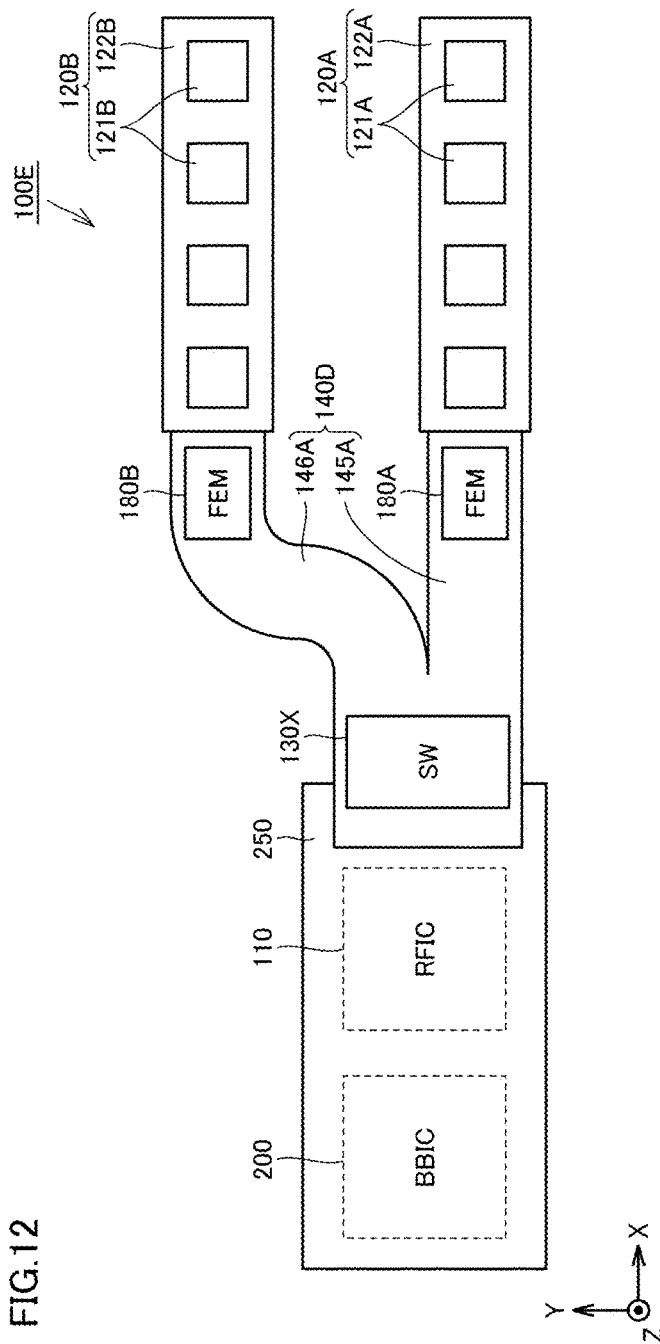
FIG. 12 is a plan view of an antenna module according to Modification 5.

FIG. 12 is a plan view of an antenna module 100E according to Modification 5. In the antenna module 100E, the connection member 140 of the antenna module 100A illustrated in FIG. 7 is replaced with a connection member 140D. Note that, in the antenna module 100E, the description of elements overlapping those of the antenna module 100A will not be repeated.

Referring to FIG. 12, the connection member 140D is a flexible substrate formed of a material having flexibility, and is configured to be bendable in an in-plane direction (that is, in XY plane) of the main surface of the connection member 140D. The connection member 140D includes a first portion 145A and a second portion 146A. In FIG. 12, the first portion 145A extends in the X-axis direction from a portion connected to the motherboard 250, and is connected to the antenna unit 120A. The second portion 146A is bent and branches off from the first portion 145A in the Y-axis direction, is further bent again in the X-axis direction, and is connected to the antenna unit 120B. Note that each of the first portion 145A and the second portion 146A of the connection member 140D may be configured to be bendable also in the thickness direction similarly to as in Modification 4. Further, the connection member 140D may be configured to be bendable in a twisting direction around an axis in an extending direction. An FEM 180 is arranged on the front and/or back surface of the connection member 140D.

As described above, by connecting an antenna unit and a motherboard using a flexible connection member, it becomes possible to increase a degree of freedom in a layout of an antenna unit in a housing of a communication device. Further, by arranging an FEM on a connection member, deterioration of antenna characteristics due to extension of a signal transfer path may be suppressed.

[Arrangement Example of Antenna Unit]

Figure 13:
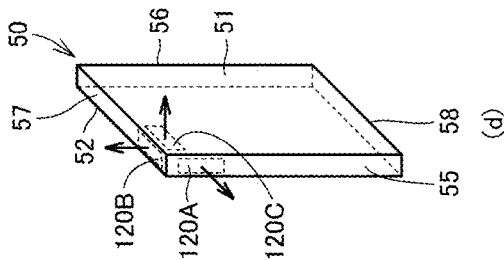
FIG. 13 is a view illustrating an arrangement example of an antenna unit in a communication device.
Figure 13:
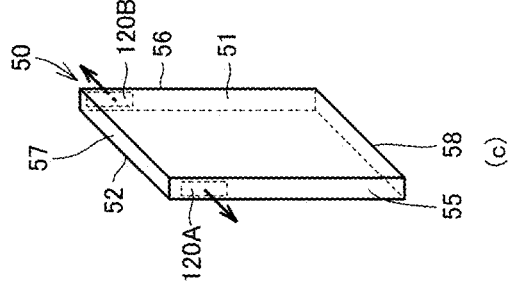
Figure 13:
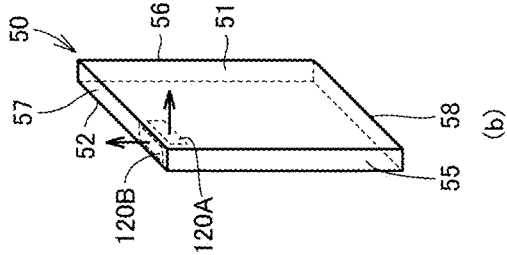
Figure 13:
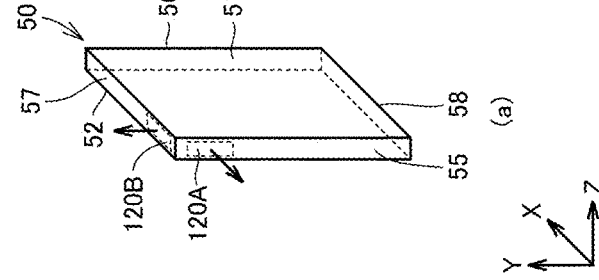

In FIG. 13, an arrangement example of an antenna unit in a communication device, in a case where the antenna module illustrated in each of the embodiments described above is applied, will be described.

The housing 50 of the communication device 10 has a substantially rectangular parallelepiped shape, and has main surfaces 51 and 52 whose normal direction is the Z-axis direction, side surfaces 55 and 56 whose normal direction is the X-axis direction, and side surfaces 57 and 58 whose normal direction is the Y-axis direction.

In a first example of FIG. 13(*a*), the antenna unit 120A is arranged on the side surface 55, and the antenna unit 120B is arranged on the side surface 57. In the first example, radio waves may be radiated in a negative direction of the X-axis and a positive direction of the Y-axis.

In a second example of FIG. 13(*b*), the antenna unit 120A is arranged on the main surface 51, and the antenna unit 120B is arranged on the side surface 57. In the second example, radio waves may be radiated in the positive direction of the Y-axis and a positive direction of the Z-axis.

In a third example of FIG. 13(*c*), the antenna unit 120A is arranged on the side surface 55, and the antenna unit 120B is arranged on the side surface 56. In the third example, radio waves may be radiated in the positive and negative directions of the X-axis.

In a fourth example of FIG. 13(*d*), the antenna unit 120A is arranged on the side surface 55, the antenna unit 120B is arranged on the side surface 57, and an antenna unit 120C is arranged on the main surface 51. In the fourth example, radio waves may be radiated in three directions including the negative direction of the X-axis, the positive direction of the Y-axis, and the positive direction of the Z-axis.

Note that the arrangement illustrated in FIG. 13 is an example, and the surfaces on which the antenna units are arranged may be a combination other than that in FIG. 13. For example, multiple antenna units may be arranged on the same side surface while being apart from each other. In each arrangement example of FIG. 13, the antenna unit is arranged at an end portion, but the antenna unit may be arranged near the center of each surface. Further, the number of antenna units arranged in the communication device may be four or more.

Under a condition radio waves are radiated from a communication device in all directions of the X-axis, the Y-axis, and the Z-axis, at least six antenna units are required. In the case above, under a condition an RFIC is arranged for each antenna unit, a space for arranging six RFICs is required on a motherboard. The number of RFICs to be arranged on a motherboard may be decreased by sharing an RFIC between multiple antenna units by using a switch circuit as in the present embodiment described above. This makes it possible to reduce a motherboard and a communication device in size.

<Modification of Connection Terminal>

In the embodiment described above, an example as follows has been described. The connection terminals 150A and 150B, used for connecting the connection member or the motherboard to the antenna unit, and the connection terminals 155, 155A, and 155B, used for connecting the motherboard and the connection member, are formed between the mutually facing surfaces of the members to be connected. However, these connection terminals may have another connection mode.

Figure 14:
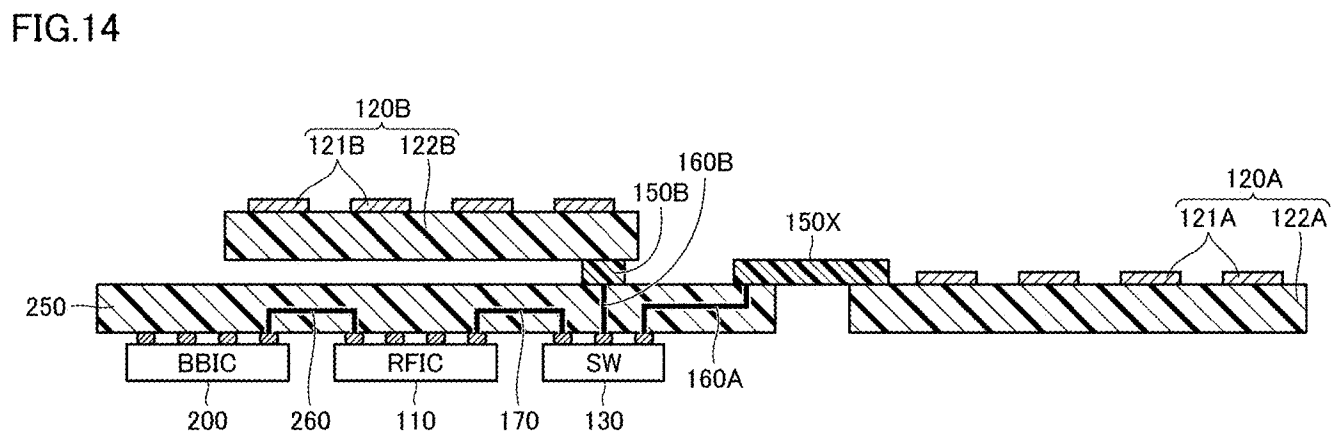

For example, a connection mode is described as follows using the connection between the motherboard 250 and the antenna unit 120A in FIG. 2 as an example. An antenna module may be configured such that an end portion of the motherboard 250 and an end portion of the antenna unit 120A are arranged to face each other, and the front surfaces (or back surfaces) of the motherboard 250 and the antenna unit 120A are connected by a connection terminal 150X as illustrated in FIG. 14. Note that the connection terminal 150X may be a combination of multiple connectors 150X1 and 150X2 each having a conductive pin and/or a socket as illustrated in FIG. 15.

Figure 16:
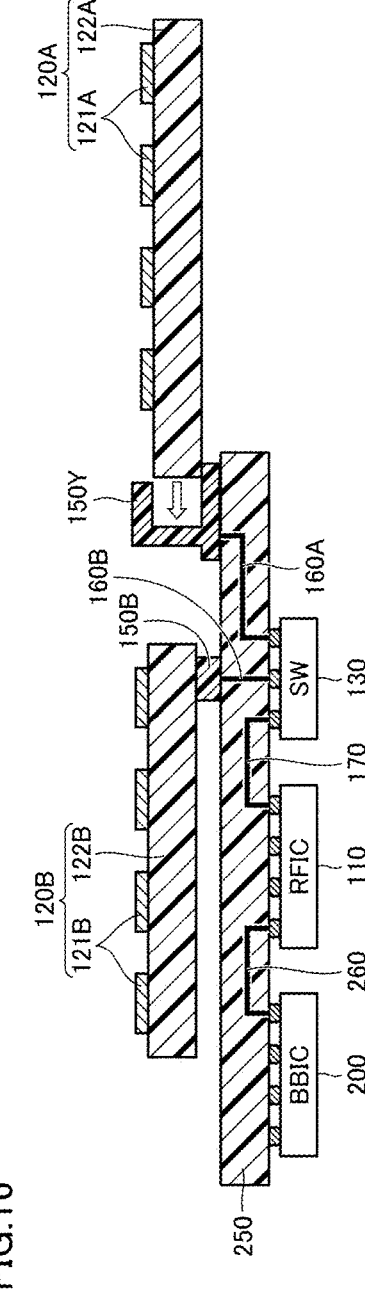
FIG. 16 is a view illustrating a second modification of a connection terminal.

Further, an antenna module may be configured such that a terminal portion is formed at an end portion of the antenna unit 120A, and the antenna unit 120A is fitted and connected to a connection terminal 150Y mounted on a front surface of the motherboard 250 as illustrated in FIG. 16.

Figure 15:
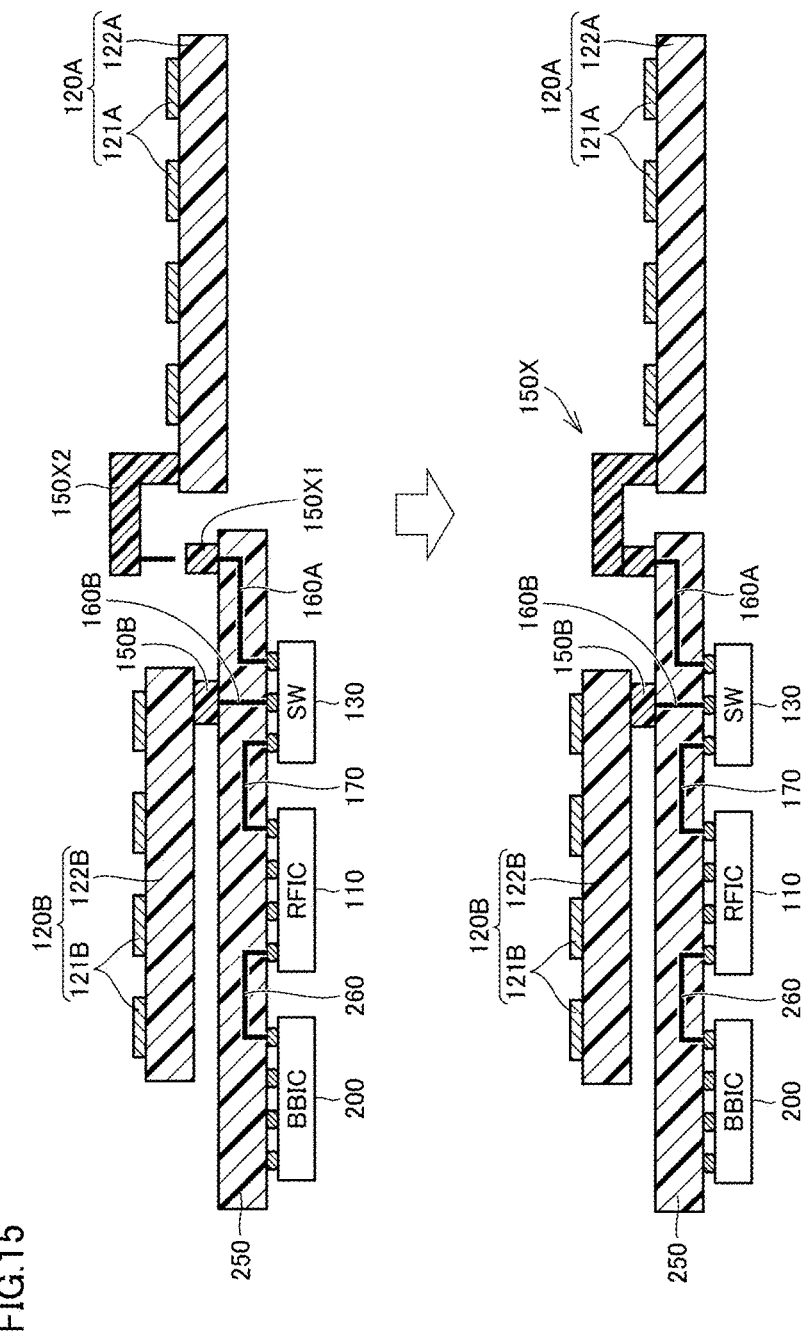
FIG. 15 is a view illustrating an example of a connection terminal in FIG. 14.

Note that the connection modes of FIG. 14 to FIG. 16 may also be applied to the connection between the antenna unit 120B and the motherboard 250. Further, the connection mode may also be applied to a connection between an antenna unit and a connection member and a connection between a motherboard and a connection member.

Embodiment 3

(Configuration of Communication Device)

In Embodiment 3, an example of a case of a so-called dual-band type antenna module, capable of radiating radio waves in two different frequency bands from an antenna unit, will be described.

Figure 17:
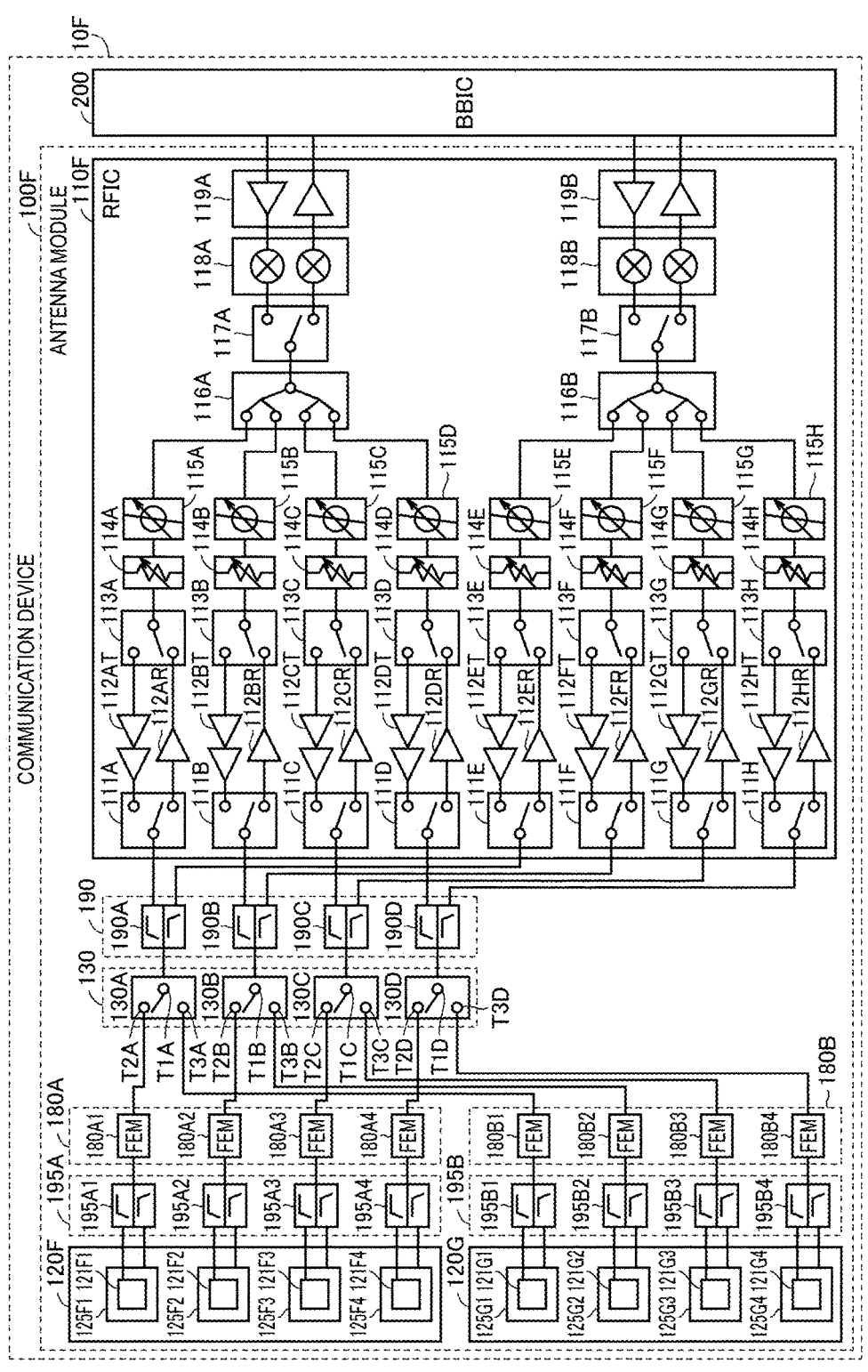
FIG. 17 is a block diagram of a communication device to which an antenna module according to Embodiment 3 is applied.

FIG. 17 is a block diagram of a communication device 10F to which an antenna module 100F according to Embodiment 3 is applied. Referring to FIG. 17, the communication device 10F includes the antenna module 100F and the BBIC 200. The antenna module 100F includes an RFIC 110F, antenna units 120F and 120G, the switch circuit 130, the FEMs 180A and 180B, and filter elements 190, 195A and 195B.

The antenna units 120F and 120G are dual-band type antenna units as described above, and each of the radiating elements arranged in each of the antenna units 120F and 120G includes two feed elements. The antenna unit 120F includes feed elements 121F and 125F, and the antenna unit 120G includes feed elements 121G and 125G. A radio frequency signal is individually supplied to each feed element from the RFIC 110F. Note that "feed element 121F" and "feed element 121G" in Embodiment 3 correspond to "first element" in the present disclosure. Further, "feed element 125F" and "feed element 125G" in Embodiment 3 correspond to "second element" in the present disclosure.

The RFIC 110F includes switches 111A to 111H, 113A to 113H, 117A, and 117B; power amplifiers 112AT to 112HT; low-noise amplifiers 112AR to 112HR; attenuators 114A to 114H; phase shifters 115A to 115H; signal combiner/dividers 116A and 116B; mixers 118A and 118B; and amplifiers 119A and 119B.

Among them, a configuration of the switches 111A to 111D, 113A to 113D, and 117A; the power amplifiers 112AT to 112DT; the low-noise amplifiers 112AR to 112DR; the attenuators 114A to 114D; the phase shifters 115A to 115D; the signal combiner/divider 116A; the mixer 118A; and the amplifier 119A is a circuit for the feed elements 121F and 121G of a high-frequency side. Further, a configuration of the switches 111E to 111H, 113E to 113H, and 117B; the power amplifiers 112ET to 112HT; the low-noise amplifiers 112ER to 112HR; the attenuators 114E to 114H; the phase shifters 115E to 115H; the signal combiner/divider 116B; the mixer 118B; and the amplifier 119B is a circuit for the feed elements 125F and 125G of a low-frequency side.

In a case of transmitting a radio frequency signal, the switches 111A to 111H and 113A to 113H are changed over to the power amplifiers 112AT to 112HT, and the switches 117A and 117B are connected to transmission side amplifiers of the amplifiers 119A and 119B. In a case of receiving a radio frequency signal, the switches 111A to 111H and 113A to 113H are changed over to the low-noise amplifiers 112AR to 112HR, and the switches 117A and 117B are connected to reception side amplifiers of the amplifiers 119A and 119B.

The filter element 190 includes diplexers 190A to 190D. Further, the filter element 195A includes diplexers 195A1 to 195A4. The filter element 195B includes diplexers 195B1 to 195B4. Each diplexer includes a high pass filter (first filter) that allows a radio frequency signal in a high frequency band (first frequency band) to pass therethrough and a low pass filter (second filter) that allows a radio frequency signal in a low frequency band (second frequency band) to pass therethrough. "Filter element 190" in Embodiment 3 corresponds to "first filter element" in the present disclosure. Further, "filter element 195A" and "filter element 195B" in Embodiment 3 correspond to "second filter element" in the present disclosure.

The high pass filters in the diplexers 190A to 190D are respectively connected to the switches 111A to 111D in the RFIC 110F. The low pass filters in the diplexers 190A to 190D are respectively connected to the switches 111E to 111H in the RFIC 110F. Common terminals of the diplexers 190A to 190D are respectively connected to the first terminals T1A to T1D of the switches 130A to 130D of the switch circuit 130.

The second terminal T2A of the switch 130A is connected to the diplexer 195A1 of the filter element 195A via the FEM 180A1. The third terminal T3A of the switch 130A is connected to the diplexer 195B1 of the filter element 195B via the FEM 180B1. The second terminal T2B of the switch 130B is connected to the diplexer 195A2 of the filter element 195A via the FEM 180A2. The third terminal T3B of the switch 130B is connected to the diplexer 195B2 of the filter element 195B via the FEM 180B2.

The second terminal T2C of the switch 130C is connected to the diplexer 195A3 of the filter element 195A via the FEM 180A3. The third terminal T3C of the switch 130C is connected to the diplexer 195B3 of the filter element 195B via the FEM 180B3. The second terminal T2D of the switch 130D is connected to the diplexer 195A4 of the filter element 195A via the FEM 180A4. The third terminal T3D of the switch 130D is connected to the diplexer 195B4 of the filter element 195B via the FEM 180B4.

The high pass filters in the diplexers 195A1 to 195A4 are respectively connected to feed elements 121F1 to 121F4 in the antenna unit 120F. The low pass filters in the diplexers 195A1 to 195A4 are respectively connected to feed elements 125F1 to 125F4 in the antenna unit 120F.

The high pass filters in the diplexers 195B1 to 195B4 are respectively connected to feed elements 121G1 to 121G4 in the antenna unit 120G. The low pass filters in the diplexers 195B1 to 195B4 are respectively connected to feed elements 125G1 to 125G4 in the antenna unit 120G.

As described above, paths through which a radio frequency signal is transferred to each radiating element is made common between the filter element 190, and the filter element 195A or the filter element 195B.

Figure 18:
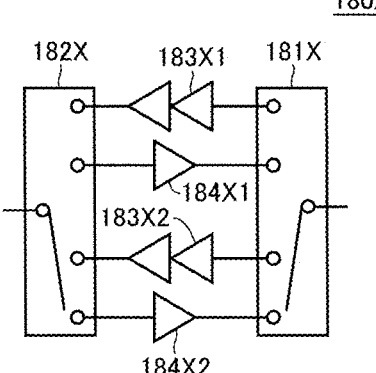
FIG. 18 is a diagram illustrating a modification of a front-end module.

Note that the FEMs included in the FEMs 180A and 180B may have the same configuration as that illustrated in FIG. 6, for example. Alternatively, as in an FEM 180X illustrated in FIG. 18, a power amplifier 183X1 and a low-noise amplifier 184X1 that correspond to a high-frequency side circuit, and a power amplifier 183X2 and a low-noise amplifier 184X2 that correspond to a low-frequency side circuit may individually be provided. By providing a power amplifier and a low-noise amplifier suitable for each frequency, it becomes possible to appropriately adjust the antenna characteristics.

(Configuration of Antenna Module)

Figure 19:
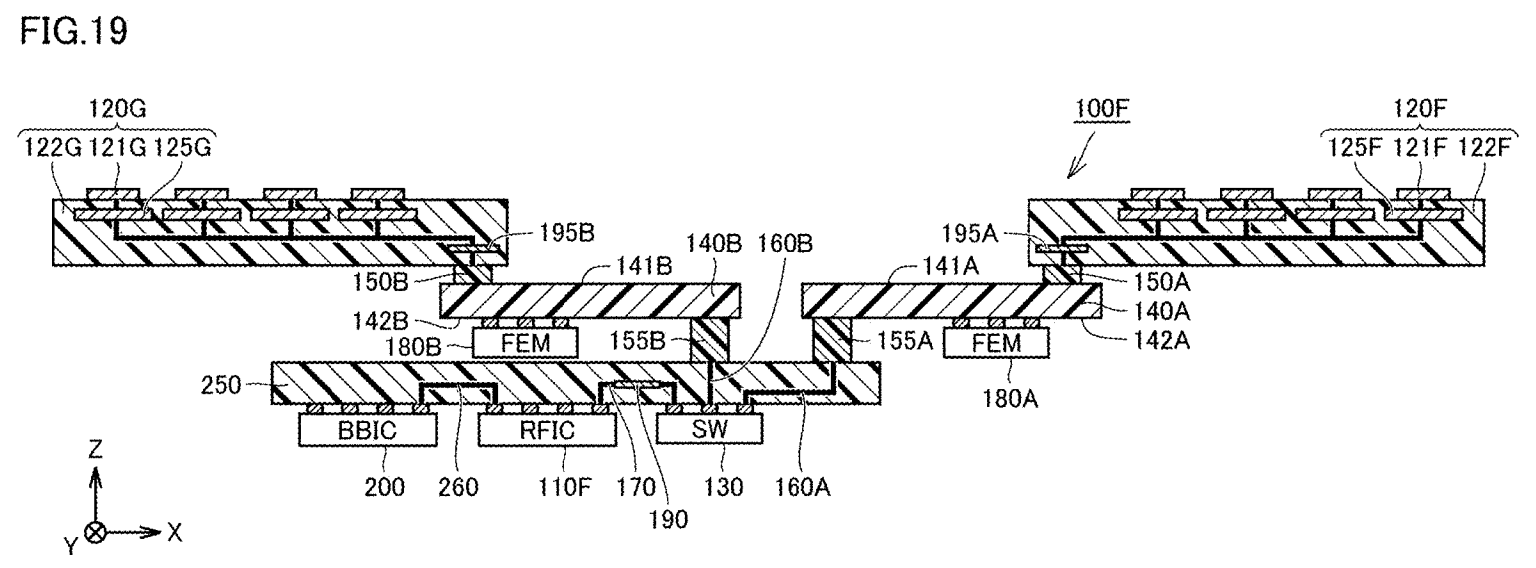
Figure 20:
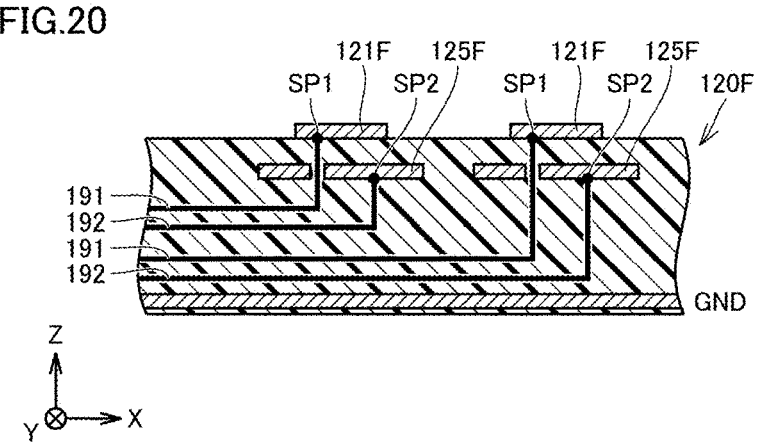
FIG. 20 is a partial sectional view of an antenna unit.
Figure 21:
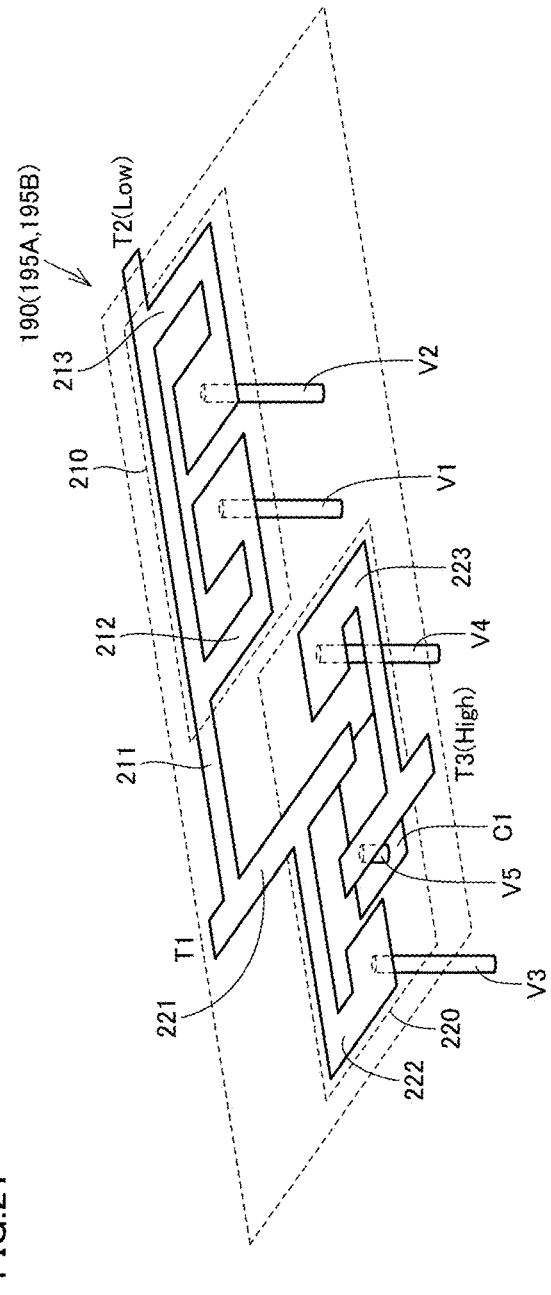
FIG. 21 is a view for explaining a configuration of a diplexer.

Next, a detailed configuration of the antenna module 100F according to Embodiment 3 will be described with reference to FIG. 19 to FIG. 21. FIG. 19 is a side view of the antenna module 100F. FIG. 20 is a partial sectional view of the antenna unit 120F. FIG. 21 is a diagram for explaining a configuration example of a diplexer.

In FIG. 19, the antenna unit 120A in the antenna module 100C described with reference to FIG. 10 above is replaced with the antenna unit 120F, and the antenna unit 120B is replaced with the antenna unit 120G. Further, the RFIC 110 is replaced with the RFIC 110F. In FIG. 19, the filter element 190 is newly provided on the motherboard 250, and the filter elements 195A and 195B are newly provided in the antenna units 120F and 120G, respectively. In FIG. 19, the description of elements overlapping those in FIG. 10 will not be repeated. Note that, although the BBIC 200 is mounted on the motherboard 250 in FIG. 19, the BBIC 200 may be formed on another substrate (not illustrated).

Referring to FIG. 19 to FIG. 21, each of the antenna units 120F and 120G is configured to be capable of radiating radio waves in two different frequency bands as described above.

The antenna unit 120F includes the feed element 121F and the feed element 125F that are formed on or in a dielectric substrate 122F. The feed element 121F and the feed element 125F are arranged to overlap each other in plan view of the dielectric substrate 122F from the normal direction, and the feed element 125F is arranged between the feed element 121F and the ground electrode GND. The size of the feed element 121F is smaller than the size of the feed element 125F. Accordingly, from the feed element 121F, a radio wave in a frequency band higher than that of the feed element 125F is radiated. Radio frequency signals from the RFIC 110F are individually supplied to each of the feed element 121F and the feed element 125F. More specifically, as illustrated in FIG. 20, a radio frequency signal on a high-frequency side (39 GHz band, for example) is supplied to the feed element 121F through a feed wiring line 191, and a radio frequency signal on a low-frequency side (28 GHz band, for example) is supplied to the feed element 125F through a feed wiring line 192. The feed wiring line 191 extends through the feed element 125F and is connected to a feed point SP1 of the feed element 121F. The feed wiring line 192 is connected to a feed point SP2 of the feed element 125F.

The antenna unit 120G includes the feed element 121G and the feed element 125G that are formed on or in a dielectric substrate 122G. The configuration of the antenna unit 120G is the same as that of the antenna unit 120F.

Each of the filter elements 190, 195A, and 195B includes flat plate shaped electrodes and vias as illustrated in FIG. 21. More specifically, each of the filter elements 190, 195A, and 195B includes a terminal T1 to which the feed wiring line made common is connected, a terminal T2 to which a feed wiring line of a low-frequency side is connected, and a terminal T3 to which a feed wiring line of a high-frequency side is connected. A low pass filter 210 is formed between the terminal T1 and the terminal T2, and a high pass filter 220 is formed between the terminal T1 and the terminal T3.

The low pass filter 210 includes a linear flat plate shaped electrode 211 connected to the terminal T1 and the terminal T2, and flat plate shaped electrodes 212 and 213 branching off from the flat plate shaped electrode 211 and are arranged to face each other with a predetermined gap therebetween. The flat plate shaped electrode 212 and the flat plate shaped electrode 213 are arranged to be line symmetrical in plan view in the normal direction of the substrate, and are electromagnetically coupled to each other. End portions of the flat plate shaped electrode 212 and the flat plate shaped electrode 213 are respectively connected to the ground electrode GND through a via V1 and a via V2. That is, the low pass filter 210 constitutes an LC series resonance circuit of a so-called π-type circuit including: a series inductor (flat plate shaped electrode 211) formed between the terminal T1 and the terminal T2, and two shunt stubs (flat plate shaped electrodes 212 and 213 plus vias V1 and V2) branching off therefrom.

The high pass filter 220 includes a linear flat plate shaped electrode 221 whose one end is connected to the terminal T1, flat plate shaped electrodes 222 and 223, and a capacitor electrode C1. The flat plate shaped electrode 222 branches off from the flat plate shaped electrode 221, and an end portion thereof is connected to the ground electrode GND through a via V3. The other end of the flat plate shaped electrode 221 faces the capacitor electrode C1 arranged in a different layer. The flat plate shaped electrode 221 and the capacitor electrode C1 form a capacitor. One end of the flat plate shaped electrode 223 is connected to the ground electrode GND through a via V4, and the other end thereof is connected to the capacitor electrode C1 through a via V5. Further, the flat plate shaped electrode 223 is also connected to the terminal T3. That is, the high pass filter 220 constitutes an LC series resonance circuit of a so-called π-type circuit including: a series capacitor (flat plate shaped electrode 221 and capacitor electrode C1) formed between the terminal T1 and the terminal T3, and two shunt stubs (flat plate shaped electrodes 222 and 223 plus vias V3 and V5) branching off from both ends of the capacitor.

Note that, the low pass filter 210 and the high pass filter 220 may be arranged in the same layer as illustrated in FIG. 21, or may be arranged in different layers to partially overlap each other in plan view in the normal direction of the substrate in which the filter elements are formed. In a case where the low pass filter 210 and the high pass filter 220 are formed in different layers, the ground electrode GND is arranged in a layer between the low pass filter 210 and the high pass filter 220 in order to prevent mutual coupling.

The filter element 190 is formed inside the motherboard 250. The filter element 195A is formed inside the dielectric substrate 122F of the antenna unit 120F. The filter element 195B is formed inside the dielectric substrate 122G of the antenna unit 120G.

Two radio frequency signals having different frequency bands individually outputted from the RFIC 110F are transferred to a feed wiring line made common via the filter element 190. The feed wiring line made common is changed over to either a signal transfer path to the antenna unit 120F or a signal transfer path to the antenna unit 120G by the switch circuit 130. The feed wiring lines from the switch circuit 130 extend to the antenna units 120F and 120G via the connection terminal 155, the connection member 140, and the connection terminal 150.

The feed wiring line made common reaching each antenna unit is branched into a high-frequency side path and a low-frequency side path by the filter elements 195A and 195B formed in the antenna units 120F and 120G. The high-frequency side path is connected to the feed elements 121F and 121G, and the low-frequency side path is connected to the feed elements 125F and 125G.

In a case of a dual-band type antenna module in which each feed element is individually fed, the same number of feed wiring lines as the number of feed elements are basically required from an RFIC to the feed elements. In particular, in a case of a so-called dual polarization type antenna unit capable of radiating radio waves in two different polarization directions from each feed element, twice as many feed wiring lines as the number of feed elements are required. For example, as illustrated in FIG. 17 and FIG. 19, in a case where four feed elements are provided for each frequency band (total number of feed elements is eight), under a condition the antenna unit is a dual polarization type, 16 feed wiring lines are required for each antenna unit. In the case above, the width or thickness of the connection member needs to be increased, and there is a possibility that it will become hard to arrange a connection member in an apparatus or it becomes impossible to ensure the flexibility of the connection member. Further, with respect to the connection terminals 150A, 150B, 155A, and 155B, the same number of terminals as the number of feed wiring lines arranged in a connection member are required. This increases the size of a connector and increases an arrangement area for the connector on a motherboard and an antenna unit.

Meanwhile, in the antenna module 100F according to Embodiment 3, the filter elements (diplexers) 190, 195A, and 195B are respectively arranged on the motherboard 250 and the antenna units 120F and 120G, so that the feed wiring lines are partially made common. This makes it possible to decrease the total number of feed wiring lines arranged in the connection members 140A and 140B. Thus, the size (width and thickness) of the connection members 140A and 140B may be reduced, and in addition, the mounting area on the motherboard 250 and the antenna units 120F and 120G may be reduced. Further, the number of terminals of an FEM arranged on a connection member may be decreased.

Figure 22:
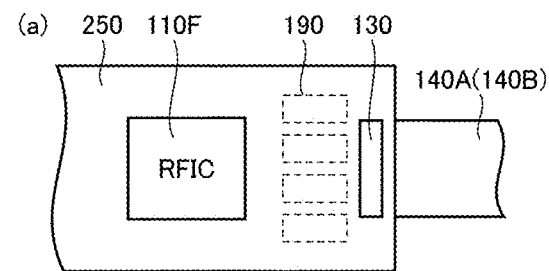
FIG. 22 is a view illustrating an arrangement example of a filter element in a motherboard.
Figure 22:
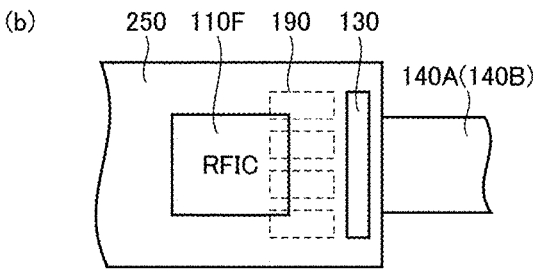
Figure 23:
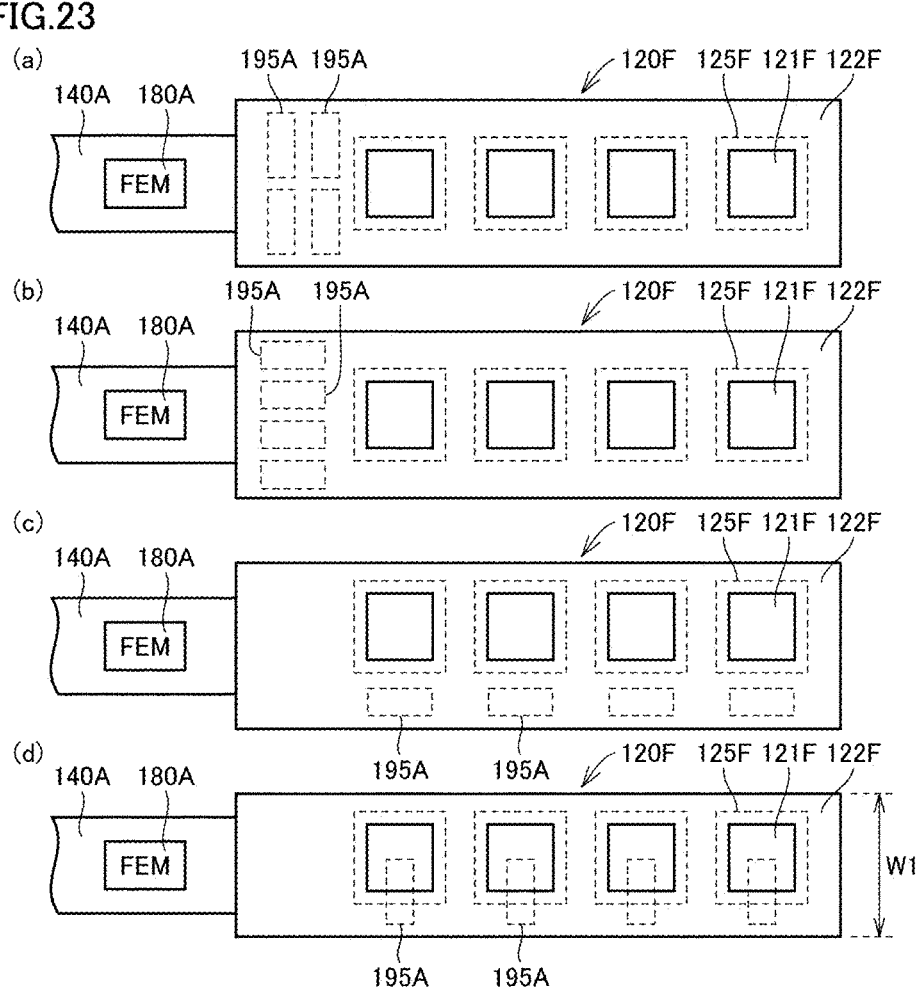
FIG. 23 is a view illustrating an arrangement example of a filter element in an antenna unit.

Next, an arrangement example of a filter element in the motherboard 250 and an antenna unit will be described. FIG. 22 is a view illustrating an arrangement example of the filter element 190 in the motherboard 250. Further, FIG. 23 is a view illustrating an arrangement example of the filter element 195A in the antenna unit 120F. Note that, the filter element 195B in the antenna unit 120G may be arranged in the same manner as the filter element 195A in FIG. 23.

Referring to FIG. 22, since each diplexer included in the filter element 190 is connected to the RFIC 110F and the switch circuit 130 as described above, the filter element 190 is arranged between the RFIC 110F and the switch circuit 130 in plan view of the motherboard 250 (FIG. 22(a)).

The RFIC 110 and the switch circuit 130 are mounted on an outer surface of the motherboard 250, and the filter element 190 is formed inside the motherboard 250. Accordingly, the filter element 190 may be arranged at a position partially overlapping the RFIC 110F and/or the switch circuit 130 in plan view of the motherboard 250 as in FIG. 22(b). Further, in a case where the filter element 190 is formed as a chip component, the filter element 190 may be arranged on the outer surface of the motherboard 250.

Referring to FIG. 23, each diplexer included in the filter element 195A is arranged on a path connecting the connection terminal 150A and each feed element in the antenna unit 120F. FIGS. 23(a) and (b) are examples in which the filter element 195A is arranged in a space between an end portion of the dielectric substrate 122F on a side to which the connection member 140A is connected, and a radiating element closest to the end portion. In FIG. 23(a), the diplexers are arranged in two rows such that a longitudinal direction of an outer shape of each diplexer is oriented in a direction orthogonal to an arrangement direction of radiating elements. In FIG. 23(b), the diplexers are arranged such that the longitudinal direction of the outer shape of each diplexer is oriented in the arrangement direction of the radiating elements. In the case of the arrangement above, although a size of the dielectric substrate 122F in the arrangement direction of the radiating elements slightly increases, an increase in size in the thickness direction as seen in the example of FIG. 23(*d*) to be described later does not arise. Thus, the arrangement is suitable for a case of lowering a profile.

FIG. 23(*c*) is an arrangement example in which each diplexer is arranged side by side with a corresponding radiating element in a direction orthogonal to the arrangement direction of the radiating elements. In the case of the arrangement example above, since a space in the vicinity of the connection with the connection member 140A may be ensured in the dielectric substrate 122F, the design of a wiring line layout in the dielectric substrate 122F is facilitated. Further, since feeding can be established by a feed wiring line made common to the vicinity of each radiating element, the number of feed wiring lines in the antenna unit 120F may be decreased. In addition, in the case above, since a radiating element and a diplexer do not overlap each other in plan view of the dielectric substrate 122F, the arrangement is suitable for a case of lowering a profile.

In the arrangement example of FIG. 23(*d*), a diplexer is arranged in the vicinity of each radiating element, the same as in FIG. 23(*c*), but the diplexer is arranged to partially overlap the corresponding radiating element in plan view of the dielectric substrate 122F. That is, the diplexer is arranged in the dielectric substrate 122F in a layer lower than that of the radiating element. In the case of the arrangement above, the size of the dielectric substrate 122F in the thickness direction may increase, but a size W1 of the dielectric substrate 122F in a width direction (direction orthogonal to the arrangement direction of radiating elements) may be reduced. Thus, the arrangement is suitable for reducing the antenna unit 120F in size.

As described above, in a dual-band type antenna module capable of radiating radio waves in two different frequency bands, by arranging the diplexers in front and rear of a connection member, the number of feed wiring lines arranged in the connection member may be decreased. As a result, in an antenna module, an increase in size due to an increase in the number of wiring lines may be suppressed.

Note that, even in a case of radiating a radio wave in one frequency band, under a condition the antenna module is the dual polarization type capable of radiating radio waves in two different polarization directions, the number of feed wiring lines arranged in a connection member may be decreased by using the filter element as described above.

Further, in the antenna units 120F and 120G described above, a configuration has been described in which the feed element 121F and the feed element 125F are arranged to overlap each other in plan view in the normal direction of the dielectric substrate. However, the feed element 121F and the feed element 125F may be arranged not to overlap each other.

(Modification 6)

In Embodiment 3, for a configuration in which each radiating element is individually fed in a dual-band type antenna module, an example has been described in which a diplexer is used.

In Modification 6, for a dual-band type antenna module using a feed element and a parasitic element as radiating elements, an example will be described in which a diplexer is used.

Figure 24:
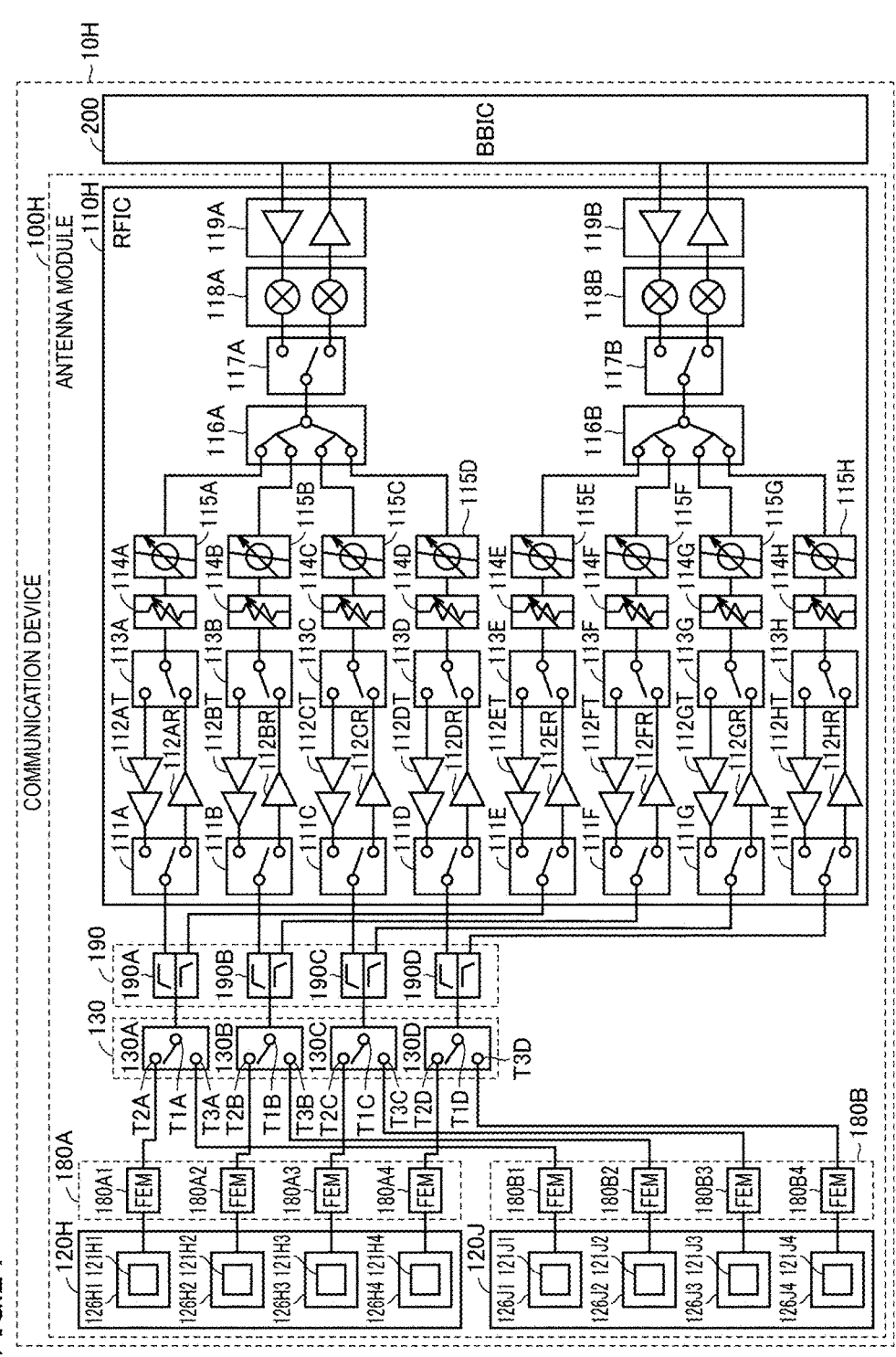
FIG. 24 is a block diagram of a communication device to which an antenna module according to Modification 6 is applied.

FIG. 24 is a block diagram of a communication device 10H to which an antenna module 100H according to Modification 6 is applied. Referring to FIG. 24, the communication device 10H includes the antenna module 100H and the BBIC 200. The antenna module 100H includes an RFIC 110H, antenna units 120H and 120J, the switch circuit 130, the FEMs 180A and 180B, and the filter element 190. As in the antenna module 100F of Embodiment 3, the FEMs 180A and 180B are arranged on the connection member 140, and the filter element 190 is arranged in the motherboard 250. Note that, since the configuration of the RFIC 110H is the same as the configuration of the RFIC 110F of Embodiment 3, the detailed description thereof will not be repeated.

Figure 25:
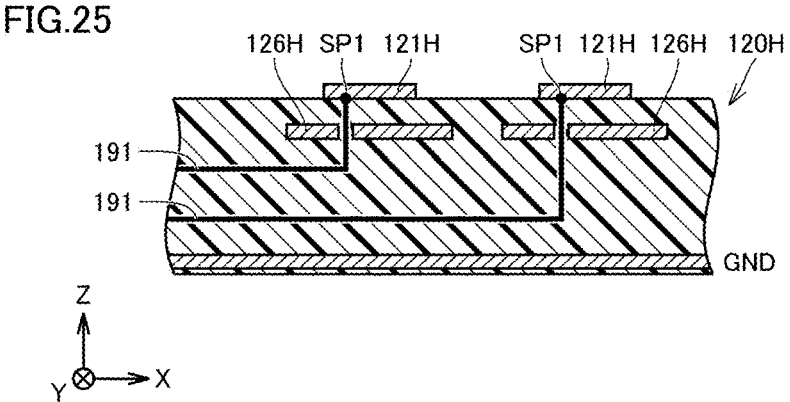
FIG. 25 is a sectional view for explaining a connection state of a feed wiring line in an antenna unit.

The antenna unit 120H is a dual-band type antenna unit, the same as the antenna unit 120F, but includes a feed element 121H (121H1 to 121H4) and a parasitic element 126H (126H1 to 126H4) as radiating elements. As illustrated in a partial sectional view of the antenna unit 120H in FIG. 25, the parasitic element 126H is arranged between the feed element 121H and the ground electrode GND in the antenna unit 120H. Note that "feed element 121H" and "feed element 121J" in Modification 6 correspond to "first element" in the present disclosure. Further, "parasitic element 126H" and "parasitic element 126J" in Modification 6 correspond to "second element" in the present disclosure.

The feed wiring line 191 extends through the parasitic element 126H and is connected to a feed point SP1 of the feed element 121H. Under a condition a radio frequency signal on a high-frequency side corresponding to the feed element 121H (39 GHz band, for example) is supplied to the feed wiring line 191, a radio wave is radiated from the feed element 121H. Whereas, under a condition a radio frequency signal on a low-frequency side corresponding to the parasitic element 126H (28 GHz band, for example) is supplied to the feed wiring line 191, the radio frequency signal is transferred to the parasitic element 126H. This is performed in a non-contact manner by electromagnetic coupling between the feed wiring line 191 and the parasitic element 126H in the extending portion of the feed wiring line 191. Thus, a radio wave is radiated from the parasitic element 126H.

The antenna unit 120J includes a feed element 121J (121J1 to 121J4) and a parasitic element 126J (126J1 to 126J4) as radiating elements. Since the configuration of the antenna unit 120J is the same as that of the antenna unit 120H, the detailed description thereof will not be repeated.

As described above, also in a dual-band type antenna module using a feed element and a parasitic element, radio frequency signals in respective frequency bands are individually outputted from the RFIC 110H. Thus, under a condition these signals are transferred to the antenna unit 120H and 120J by using individual feed wiring lines, it is necessary to arrange the same number of feed wiring lines as the number of radiating elements in the connection members 140A and 140B. However, in the antenna module 100H of Modification 6, the filter element 190 including a diplexer is provided in the motherboard 250, and a feed wiring line for transferring a radio frequency signal on a high-frequency side and a feed wiring line for transferring a radio frequency signal on a low-frequency side are made common. Thus, the number of feed wiring lines arranged in the connection members 140A and 140B may be decreased. As a result, in an antenna module, an increase in size due to an increase in the number of wiring lines may be suppressed.

Note that, in Embodiment 3 and Modification 6, a configuration has been described in which a filter element including a diplexer is used for a dual-band type antenna module. However, also in an antenna module capable of radiating radio waves in three or more different frequency bands, it is possible to decrease the number of feed wiring lines arranged in a connection member by using a filter element including a triplexer or a multiplexer.

Embodiment 4

(Configuration of Communication Device)

In Embodiment 4, a configuration example will be described in which a diplexer is not used in a dual-band type antenna module the same as that of Embodiment 3.

Figure 26:
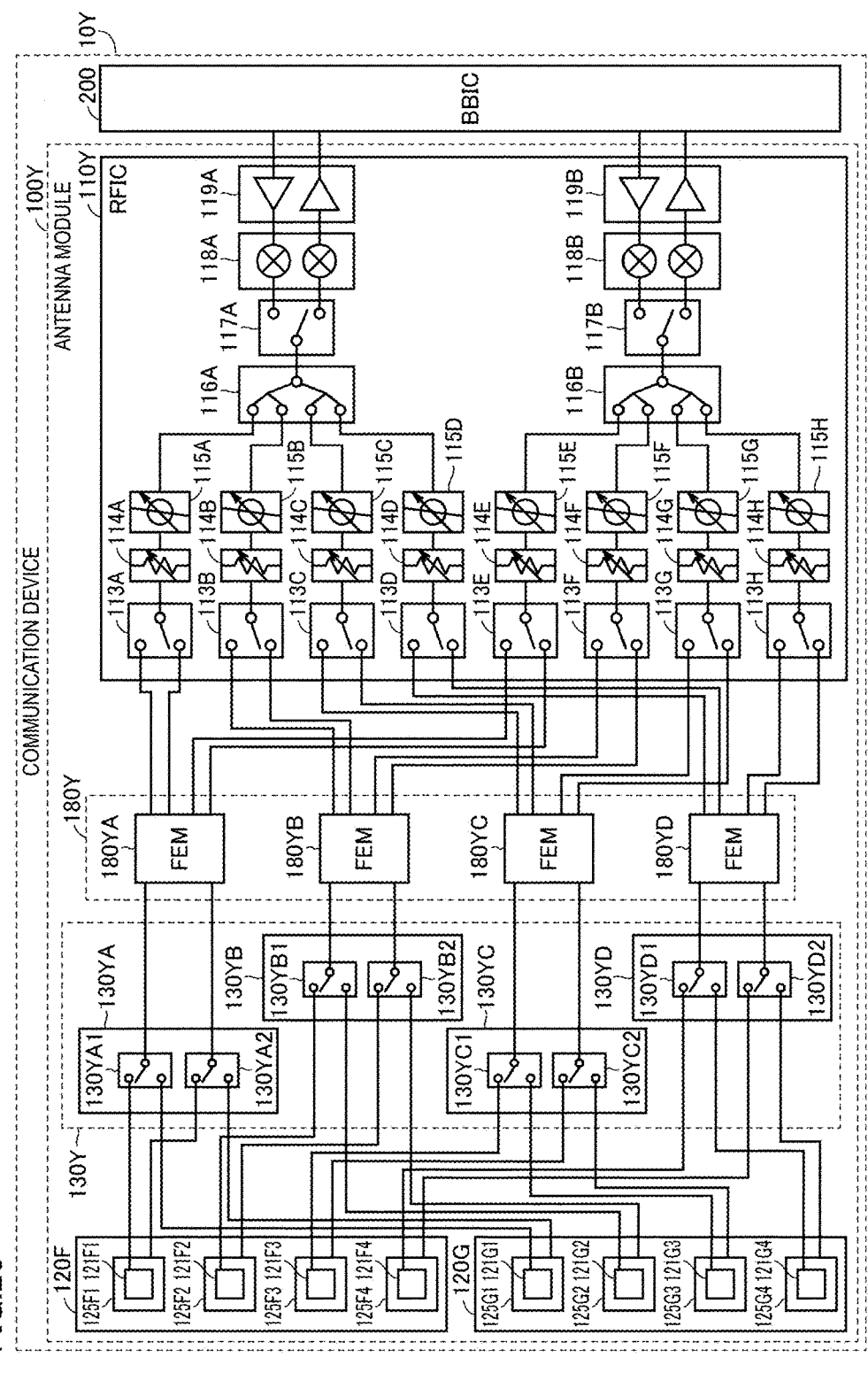
FIG. 26 is a block diagram of a communication device to which an antenna module according to Embodiment 4 is applied.

FIG. 26 is a block diagram of a communication device 10Y to which an antenna module 100Y according to Embodiment 4 is applied. Referring to FIG. 26, the communication device 10Y includes the antenna module 100Y and the BBIC 200. The antenna module 100Y includes an RFIC 110Y, the antenna units 120F and 120G, a switch circuit 130Y, and an FEM 180Y.

The antenna units 120F and 120G are the same as those in Embodiment 3, and each radiating element arranged in each of the antenna units 120F and 120G includes two feed elements. The antenna unit 120F includes the feed elements 121F and 125F, and the antenna unit 120G includes the feed elements 121G and 125G. A radio frequency signal is individually supplied from the RFIC 110Y to each feed element.

The RFIC 110Y has a configuration obtained by removing the switches 111A to 111H, the power amplifiers 112AT to 112HT, and the low-noise amplifiers 112AR to 112HR from the RFIC 110F illustrated in FIG. 17. In other words, the RFIC 110Y includes the switches 113A to 113H, 117A, and 117B; the attenuators 114A to 114H; the phase shifters 115A to 115H; the signal combiner/divider 116A and 116B; the mixers 118A and 118B; and the amplifiers 119A and 119B.

Among them, a configuration of the switches 113A to 113D, and 117A; the attenuators 114A to 114D; the phase shifters 115A to 115D; the signal combiner/divider 116A; the mixer 118A; and the amplifier 119A is a circuit for the feed elements 121F and 121G of a high-frequency side. Further, a configuration of the switches 113E to 113H, and 117B; the attenuators 114E to 114H; the phase shifters 115E to 115H; the signal combiner/divider 116B; the mixer 118B; and the amplifier 119B is a circuit for the feed elements 125F and 125G of a low-frequency side.

The FEM 180Y includes an FEM 180YA to an FEM 180YD. The switch 113A and the switch 113E are connected to the FEM 180YA, and the switch 113B and the switch 113F are connected to the FEM 180YB. Similarly, the switch 113C and the switch 113G are connected to the FEM 180YC, and the switch 113D and the switch 113H are connected to the FEM 180YD.

The switch circuit 130Y includes a switch 130YA to a switch 130YD. The switch 130YA includes switches 130YA1 and 130YA2, and the switch 130YB includes switches 130YB1 and 130YB2. Similarly, the switch 130YC includes switches 130YC1 and 130YC2, and the switch 130YD includes switches 130YD1 and 130YD2.

Figure 27:
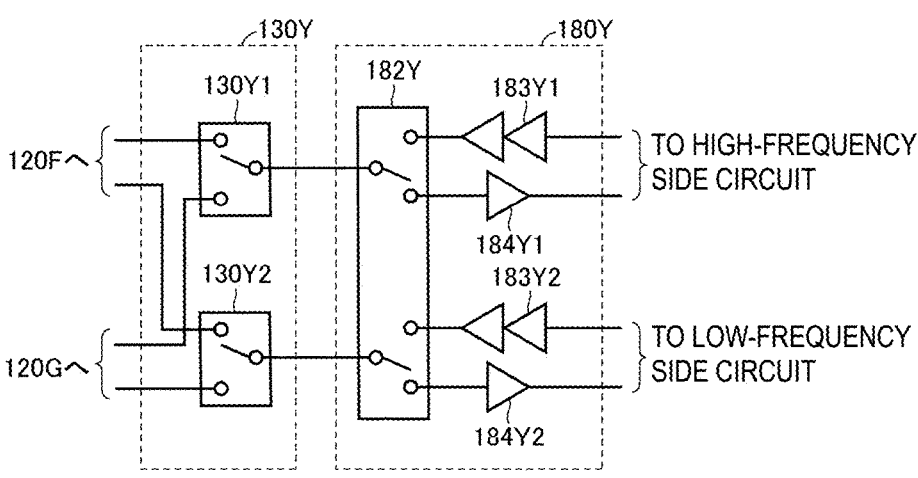
FIG. 27 is a diagram for explaining a detail of a front-end module in FIG. 26.

FIG. 27 is a diagram for explaining a detail of the FEM 180Y in FIG. 26. Note that, in FIG. 27, to facilitate the explanation, one configuration of the switch 130YA to the switch 130YD, and one configuration of the FEM 180YA to the FEM 180YD are representatively illustrated.

Referring to FIG. 27, the FEM 180Y includes a power amplifier 183Y1 and a low-noise amplifier 184Y1 that are correspond to a high-frequency side circuit; a power amplifier 183Y2 and a low-noise amplifier 184Y2 that are correspond to a low-frequency side circuit; and a switch 182Y.

The switch 182Y includes two switch circuits. One switch circuit of the switch 182Y is connected to the power amplifier 183Y1 and the low-noise amplifier 184Y1 for a high-frequency side, and connects either one of the power amplifier 183Y1 and the low-noise amplifier 184Y1 to an input terminal of a switch 130Y1 of the switch circuit 130Y. The other switch circuit of the switch 182Y is connected to the power amplifier 183Y2 and the low-noise amplifier 184Y2 for a low-frequency side, and connects either one of the power amplifier 183Y2 and the low-noise amplifier 184Y2 to an input terminal of a switch 130Y2 of the switch circuit 130Y.

The switch 182Y is a switch for changing over between transmission and reception of a radio wave, and under a condition a radio wave is radiated from the antenna units 120F and 120G, the switch circuit of the switch 182Y is connected to the power amplifiers 183Y1 and 183Y2. Whereas, under a condition a radio wave is received by the antenna units 120F and 120G, the switch circuit of the switch 182Y is connected to the low-noise amplifiers 184Y1 and 184Y2.

The switch circuit 130Y is a circuit for changing over between the antenna unit 120F and the antenna unit 120G. Each of the switches 130Y1 and 130Y2 included in the switch circuit 130Y has two output terminals. One output terminal of the switch 130Y1 is connected to the feed element 121F in the antenna unit 120F. The other output terminal of the switch 130Y1 is connected to the feed element 121G in the antenna unit 120G. Further, one output terminal of the switch 130Y2 is connected to the feed element 125F in the antenna unit 120F. The other output terminal of the switch 130Y2 is connected to the feed element 125G in the antenna unit 120G.

More specifically, as illustrated in FIG. 26, the switch 130YA1 in the switch 130YA is connected to the feed element 121F1 and the feed element 121G1. The switch 130YA2 in the switch 130YA is connected to the feed element 125F1 and the feed element 125G1. The switch 130YB1 in the switch 130YB is connected to the feed element 121F2 and the feed element 121G2. The switch 130YB2 in the switch 130YB is connected to the feed element 125F2 and the feed element 125G2.

Further, the switch 130YC1 in the switch 130YC is connected to the feed element 121F3 and the feed element 121G3. The switch 130YC2 in the switch 130YC is connected to the feed element 125F3 and the feed element 125G3. The switch 130YD1 in the switch 130YD is connected to the feed element 121F4 and the feed element 121G4. The switch 130YD2 in the switch 130YD is connected to the feed element 125F4 and the feed element 125G4.

Figure 28:
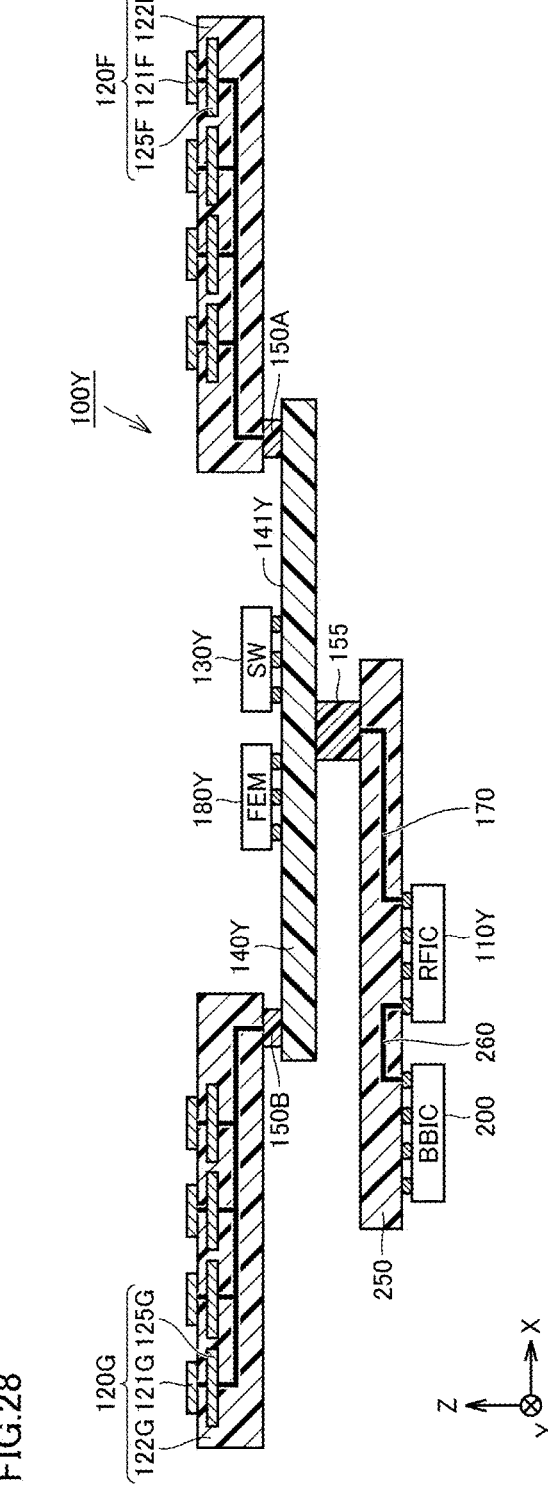
FIG. 28 is a side view of the antenna module according to Embodiment 4.

FIG. 28 is a side view of the antenna module 100Y in FIG. 26. As in the antenna module 100A of Embodiment 2 illustrated in FIG. 7, the antenna module 100Y has a configuration in which the antenna unit 120F and the antenna unit 120G are arranged on a common connection member 140Y. The switch circuit 130Y and the FEM 180Y are arranged on a front surface 141Y of the connection member 140Y.

Whereas, the switch circuit 130 on the motherboard 250 is removed, and a signal from the RFIC 110Y is transferred to the FEM 180Y via the connection terminal 155 through the connection wiring line 170. As described above, a signal from the FEM 180Y is branched by the switch circuit 130Y and transferred to the antenna unit 120F or the antenna unit 120G.

With the configuration above, a radio wave on a high-frequency side and a radio wave on a low-frequency side may be radiated from or received by the antenna units 120F and 120G while being changed over, without using the diplexer 190, 195A, or 195B as in Embodiment 3. Further, by providing high-frequency side and low-frequency side power amplifiers and high-frequency side and low-frequency side low-noise amplifiers in the FEM 180Y, an antenna characteristic at each frequency may appropriately be adjusted, and the configuration of the RFIC 110Y may be simplified.

Note that, in the antenna module 100Y described above, the configuration has been described in which a power amplifier and a low-noise amplifier are arranged in the FEM 180Y and a power amplifier and a low-noise amplifier are not provided in the RFIC 110Y. However, power amplifiers and low-noise amplifiers may be provided in both an FEM and an RFIC. In the case above, the loads of the power amplifier and the low-noise amplifier may be shared by the FEM and the RFIC. Accordingly, although the size of the RFIC becomes slightly larger than that of the antenna module 100Y described above, the size of the FEM arranged on a flexible substrate (connection member 140Y) may be reduced.

It should be understood that the embodiments disclosed herein are illustrative in all respects and are not restrictive. The scope of the present disclosure is indicated by the claims rather than the foregoing description of the embodiments, and is intended to include all modifications within the meaning and scope equivalent to the claims.

REFERENCE SIGNS LIST

10, 10A, 10F, 10H, 10Y COMMUNICATION DEVICE
50 HOUSING
51, 52 MAIN SURFACE
55 to 58 SIDE SURFACE
100, 100A to 100F, 100H, 100X, 100Y ANTENNA MODULE
110, 110F, 110H, 110Y RFIC
111A to 111H, 113A to 113H, 117, 117A, 117B, 130A to 130D, 130Y1, 130Y2, 130YA to 130YD, 181, 181X, 182, 182X, 182Y SWITCH
112AR to 112HR, 184, 184X1, 184X2, 184 Y1, 184Y2 LOW-NOISE AMPLIFIER
112AT to 112HT, 183, 183X1, 183X2, 183 Y1, 183Y2 POWER AMPLIFIER
114A to 114H ATTENUATOR
115A to 115H PHASE SHIFTER
116, 116A, 116B SIGNAL COMBINER/DIVIDER
118, 118A, 118B MIXER
119, 119A, 119B AMPLIFIER
120, 120A to 120C, 120F to 120H, 120J ANTENNA UNIT
121, 121A, 121A1 to 121A4, 121B, 121B1 to 121B4, 121F, 121F1 to 121F4, 121G, 121G1 to 121G4, 121H, 121H1 to 121H4, 121J, 121J1 to 121J4, 125F, 125F1 to 125F4, 125G, 125G1 to 125G4 FEED ELEMENT
122, 122A, 122B, 122F to 122H, 122J, 143 DIELECTRIC SUBSTRATE
123, 140, 140A to 140D, 140Y CONNECTION MEMBER
126H, 126H1 to 126H4, 126J, 126J1 to 126J4 PARASITIC ELEMENT
130, 130X, 130Y SWITCH CIRCUIT
150A, 150B, 150X, 150Y, 155, 155A, 155B CONNECTION TERMINAL
160A, 160B, 161, 162, 191, 192 FEED WIRING LINE
170, 171, 260 CONNECTION WIRING LINE
180A, 180A1 to 180A4, 180B, 180B1 to 180B4, 180X, 180Y, 180YA to 180YD FEM
190, 195A, 195B FILTER ELEMENT

190A to 190D, 195A1 to 195A4, 195B1 to 195B4 DIPLEXER
200 BBIC
210 LOW PASS FILTER
220 HIGH PASS FILTER
211 to 213, 221 to 223 FLAT PLATE SHAPED ELECTRODE
250 MOTHERBOARD
C1 CAPACITOR ELECTRODE
GND GROUND ELECTRODE
SP1, SP2 FEED POINT
T1, T1A to T1D, T2, T2A to T2D, T3, T3A to T3D TERMINAL
V1 to V5 VIA

The invention claimed is:

1. An antenna assembly, comprising:
a first substrate and a first radiating element arranged on the first substrate;
a second substrate and a second radiating element arranged on the second substrate;
a third substrate having a feed circuit that supplies a radio frequency signal to the first substrate and the second substrate is arranged;
a connection member that interconnects the first substrate, the second substrate, and the third substrate, and is configured to transfer a first radio frequency signal between the feed circuit and the first radiating element and between the feed circuit and the second radiating element; and
a switch circuit configured to controllably change over a connection between the feed circuit and the first radiating element and a connection between the feed circuit and the second radiating element.

2. The antenna assembly according to claim 1, further comprising:
a first amplifier arranged on the connection member and configured to amplify a second radio frequency signal transferred between the first radiating element and the feed circuit; and
a second amplifier arranged on the connection member and configured to amplify a third radio frequency signal transferred between the second radiating element and the feed circuit.

3. The antenna assembly according to claim 2,
wherein the first amplifier and the second amplifier are included in a discrete electronic component that is in contact with the third substrate.

4. A communication device, comprising:
the antenna assembly according to claim 2; and
a housing that accommodates the antenna module,
wherein the first amplifier and the second amplifier are arranged apart from the housing.

5. The antenna assembly according to claim 1,
wherein the switch circuit is arranged on the third substrate.

6. The antenna assembly according to claim 1,
wherein the switch circuit is arranged on the connection member.

7. The antenna assembly according to claim 1,
wherein the connection member is flexible.

8. The antenna assembly according to claim 7,
wherein the connection member includes
a multilayer structure comprising multiple laminated dielectric layers, and
a first wiring line and a second wiring line formed in layers different from each other.

9. The antenna assembly according to claim 1,
wherein the first radiating element includes a first element capable of radiating a radio wave in a first frequency band and a second element capable of radiating a radio wave in a second frequency band different from the first frequency band,
the antenna module further includes a first filter element including a first filter configured to pass a signal in the first frequency band to and a second filter configured to pass a signal in the second frequency band, and
the first filter element is arranged on the third substrate on a signal transfer path between the feed circuit and the switch circuit.

10. The antenna assembly according to claim 9,
wherein the antenna module further includes a second filter element that includes the first filter and the second filter, and
the second filter element is arranged on at least one of the first substrate and the second substrate on a signal transfer path between the connection member and one of the first radiating element and the second radiating element.

11. The antenna assembly according to claim 1, further comprising the feed circuit.

12. A communication device, provided with the antenna assembly according to claim 1.

13. An antenna assembly, comprising:
a first substrate and a first radiating element arranged on the first substrate;
a second substrate and a second radiating element arranged on the second substrate;
a third substrate having a feed circuit that supplies a radio frequency signal to the first substrate and the second substrate is arranged;
a switch circuit configured to controllably change over a connection between the feed circuit and the first radiating element and a connection between the feed circuit and the second radiating element;
a first connection member that interconnects the first substrate and the third substrate and is configured to transfer a first radio frequency signal between the feed circuit and the first radiating element;
a second connection member that interconnects the second substrate and the third substrate and is configured to transfer a second radio frequency signal between the feed circuit and the second radiating element;

first amplifier arranged on the first connection member, and configured to amplify a third radio frequency signal that is transferred between the first radiating element and the feed circuit; and
a second amplifier arranged on the second connection member, and configured to amplify a fourth radio frequency signal that is transferred between the second radiating element and the feed circuit.

14. The antenna assembly according to claim 13,
wherein the first amplifier and the second amplifier are included in a discrete electronic component that is in contact with the third substrate.

15. The antenna assembly according to claim 14,
wherein at least one of the first connection member and the second connection member has a multilayer structure comprising multiple laminated dielectric layers, and a first wiring line and a second wiring line formed in layers different from each other.

16. The antenna assembly according to claim 15,
wherein the switch circuit is arranged on the third substrate.

17. A connection member comprising:
a dielectric substrate in which a feed wiring line that transfers a radio frequency signal between a feed circuit and each of a first radiating element and a second radiating element, the connection member interconnects a first substrate on which the first radiating element is arranged and a second substrate on which the second radiating element is arranged; and
a switch circuit arranged on the dielectric substrate and configured to controllably change over a connection between the feed circuit and the first radiating element and a connection between the feed circuit and the second radiating element.

18. The connection member according to claim 17, further comprising:
a first amplifier arranged on the dielectric substrate and configured to amplify a second radio frequency signal transferred between the first radiating element and the feed circuit; and
a second amplifier arranged on the dielectric substrate and configured to amplify a third radio frequency signal transferred between the second radiating element and the feed circuit.

* * * * *